(12) United States Patent
Trusty

(10) Patent No.: US 11,072,096 B1
(45) Date of Patent: Jul. 27, 2021

(54) APPARATUSES AND METHODS TO MOLD COMPLEX SHAPES

(71) Applicant: TRUSTY-COOK, Inc., Indianapolis, IN (US)

(72) Inventor: Jerry Curtis Trusty, Indianapolis, IN (US)

(73) Assignee: Trusty-Cook, Inc., Indianapolis, IN (US)

( * ) Notice: Subject to any disclaimer, the term of this patent is extended or adjusted under 35 U.S.C. 154(b) by 0 days.

(21) Appl. No.: 16/798,288

(22) Filed: Feb. 21, 2020

(51) Int. Cl.
  *B29C 33/10* (2006.01)
  *B29C 33/00* (2006.01)

(52) U.S. Cl.
  CPC .......... *B29C 33/10* (2013.01); *B29C 33/0038* (2013.01)

(58) Field of Classification Search
  CPC ............ Y10T 82/2521; Y10T 82/2518; Y10T 82/2595; B23B 13/123; B23B 13/08; B23B 13/126; B23B 13/04; B23B 13/02; B23B 82/127; B23B 82/163; B23B 82/126; B23B 82/124; B29C 33/0044; B29C 39/10

USPC ............ 249/175–186; 82/127, 163, 126, 124
See application file for complete search history.

(56) References Cited

U.S. PATENT DOCUMENTS

| 3,674,394 | A | * | 7/1972 | Wiltshire | B29C 70/446 425/112 |
| 4,003,545 | A | * | 1/1977 | Tanaka | B28B 7/30 249/112 |
| 2002/0029669 | A1 | * | 3/2002 | Trusty | B23B 13/123 82/162 |
| 2004/0016864 | A1 | * | 1/2004 | Bracken | B29C 45/1701 249/141 |
| 2011/0074061 | A1 | * | 3/2011 | Nozoe | B29C 44/5609 264/51 |

* cited by examiner

*Primary Examiner* — Leith S Shafi
(74) *Attorney, Agent, or Firm* — Baker & McKenzie, LLP

(57) ABSTRACT

Methods and apparatuses are disclosed to mold complex shapes using a cast mold technique. A catalyst-initiated urethane can be used for these complex shapes as there is little thickness restriction on any part dimension. Moreover, urethane, once chemically activated, can be poured into cast molds with various shapes. Due to the exothermic nature of urethane, when the curing chemical reaction takes place, metal molds can be fabricated from aluminum. Cast molds, made from aluminum, utilize elastomeric seals to account for coefficients of thermal expansion.

16 Claims, 23 Drawing Sheets

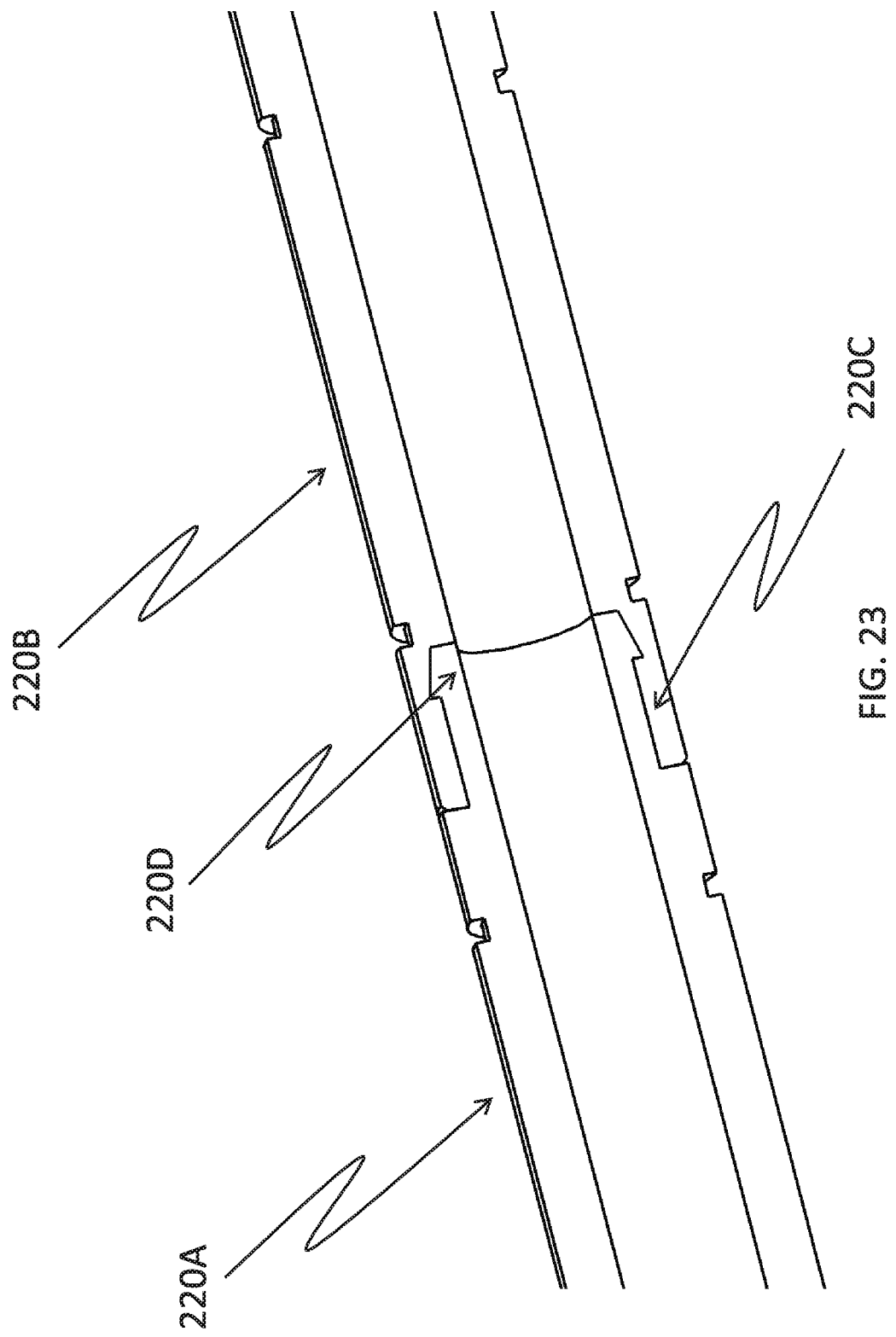

APPARATUSES AND METHODS TO MOLD COMPLEX SHAPES

TECHNICAL FIELD

This disclosure relates generally to apparatuses and methods to optimally mold complex shapes using liquid resin (e.g., urethane and a catalyst).

BACKGROUND

There is a need for a technique to mold parts of various shapes and thicknesses.

SUMMARY

Various methods and apparatuses are disclosed to allow unique and repeatable cast molding of parts particularly for use in the fabrication of spindle liners and hush tubes. Techniques such as precise temperature control, timing of catalyst addition based on a part design, pre-heating of molds, venting techniques, under molding and over molding to account for cast molding material expansion and shrinkage are all disclosed. According to one aspect of the present disclosure, an apparatus comprising a mold with a first exterior surface, a first interior surface, a cavity, and an opening to the cavity is presented. The apparatus comprises a mold ring comprising a second exterior surface, a second interior surface, and a bore. The bore of the mold ring in some embodiments is substantially parallel to the cavity comprised in the mold when the mold ring is inserted into the cavity of the mold. The apparatus also includes a seal covering at least a portion of the second exterior surface of the mold ring. The seal seals a first space between the first interior surface of the mold and the second exterior surface of the mold ring during a molding of a casting material. The apparatus also includes a cap comprising an air vent and a third interior surface covering at least a portion of the opening of the cavity. The third interior surface in some cases is substantially perpendicular to the opening of the cavity of the mold. The cap can be fabricated from a material that is heated and pressed onto a mold object having a first shape associated with the portion of the opening of the cavity. Additionally, the apparatus includes a mandrel comprising a third exterior surface. The mandrel is insertable into the cavity of the mold to create a second space associated with a multi-dimensional shape within the cavity. The multi-dimensional shape can be based on at least a first shape of the third exterior surface of the mandrel. Also, the casting material is moldable into a first object based on the multi-dimensional shape. The first object can be used as a spindle liner for a bar stock associated with the mandrel. Additionally, the apparatus also includes a clearance cover wrappable around the mandrel to maintain a clearance space between the mandrel and the first interior surface associated with the mold, the clearance space compensating for casting material shrinkage after molding.

These and other implementations may each optionally include one or more of the following features. The apparatus further comprising a flange that can be placed at a boundary between the cap and at least the portion of the opening of the cavity of the mold. The flange can be fabricated from a metalized material with a first coefficient of thermal expansion (tce) substantially equivalent to a second tce associated with the mold. The air vent comprised in the cap extends into the flange such that the air vent ranges between 0.010 inches and 0.060 inches in diameter. The multi-dimensional shape associated with the second space is partially based on a second shape of the first interior surface of the mold. In some embodiments, the multi-dimensional shape associated with the second space is partially based on a third shape of the second interior surface comprised in the mold ring. In some instances, the multi-dimensional shape associated with the second space is partially based on a fourth shape of the third interior surface of the cap. Further, the bore of the mold ring surrounds at least a portion of the mandrel with the mold ring being movable within the cavity comprised in the mold based on a length of the object molded using the casting material. Moreover, the air vent comprised in the cap is determined based on a viscosity of the casting material. In some cases, the second interior surface comprised in the mold ring partially surrounds at least one or more of: the mandrel and the clearance cover wrapped around the mandrel. In other embodiments, the mold ring is fabricated from a metalized material that has a third coefficient of thermal expansion (tce) substantially equivalent to a fourth tce associated with the mold. The mold ring with elastomeric seal can have a first diameter ranging between 0.020 inches and 0.05 inches with the first diameter being substantially smaller than a second diameter associated with the cavity comprised in the mold. Also, the clearance space can also range between 0.020 inches and 0.040 inches in some embodiments. Additionally, the casting material is a catalyst-activated urethane having an exothermic temperature ranging between 250 F and 350 F.

According to another aspect of the present disclosure, a method for molding is presented. The method comprises heating a mold, a flange, and a mold ring using convection to a temperature within a first temperature range. The method also comprises inserting the mold ring into a cavity of the mold and placing the flange at a boundary between a cap coupled to the mold and at least a portion of an opening of the cavity of the mold. Also, the method comprises inserting a mandrel into the cavity of the mold such that a volume of the mandrel is increased to compensate for a shrinkage associated with a casting material used to mold an object within the mold. Additionally, the method comprises coupling the mandrel with a first mating part within the mold, the first mating part being a previously molded part. The mandrel and the first mating part create a space associated with a multi-dimensional shape for molding the object. The object is a second mating part to the first mating part. The method also comprises injecting the casting material via a fill port of the mold to fill the space associated with the multi-dimensional shape to form the object. In one embodiment, the casting material is injected under a pressure within a specified range. The method also comprises blowing compressed air over the mandrel to decrease a frictional coefficient between the mandrel and the object to ease demolding the object. Additionally, the method comprises using a water bath to cool the mold during molding the object.

In some embodiments, the first temperature range comprises temperatures between 120 F and 150 F at a relative humidity less than or equal to 15%. In some instances, the first temperature range is substantially equivalent to a second temperature range associated with the casting material. The specified range of pressure may comprise pressures between 8 psi and 12 psi.

In one embodiment, increasing the volume of the mandrel to compensate for a shrinkage associated with the casting material comprises increasing a thickness of the mandrel by an amount ranging between 0.020 inches and 0.050 inches.

In some cases, the casting material is liquid urethane which is injected into the space associated with the multi-dimensional shape under a pressure of 10.5 psi.

In some implementations, the method comprises curing the casting material within the mold for a predefined time based on a volume of the object molded. For example, the casting material may be cured based on one of: a first time ranging between 70 seconds and 110 seconds when the volume of the object is 200 cubic inches or less; a second time ranging between 120 seconds and 200 seconds when the volume of the object being molded ranges between 250 cubic inches and 900 cubic inches; and a third time ranging between 220 seconds and 300 seconds when the volume of the object being molded is 1000 cubic inches or more.

Moreover, increasing the volume of the mandrel to compensate for a shrinkage associated with a casting material used to mold the object within the mold comprises one of: using a removable sleeve to oversize the mandrel; and machining a raw bar stock into the mandrel, the mandrel being compatible with the object to be molded.

In some embodiments, features are added post molding to account for various spindle liner inside diameters. In other embodiments, methods are disclosed to allow spindle liners to be assembled in place; particularly if there are space constraints on the bar stock feed side of the lathe spindle. In yet other embodiments, methods and apparatuses are disclosed to permit precise molding of bar stock fitment, regardless of cross-sectional dimensions, length, or bar stock material type.

DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this disclosure.

FIG. 23 is a cutaway view of FIG. 22 with the complex shapes molded for attachment using a snap feature joined together.

DESCRIPTION OF THE ILLUSTRATED EMBODIMENTS

Figure 1:
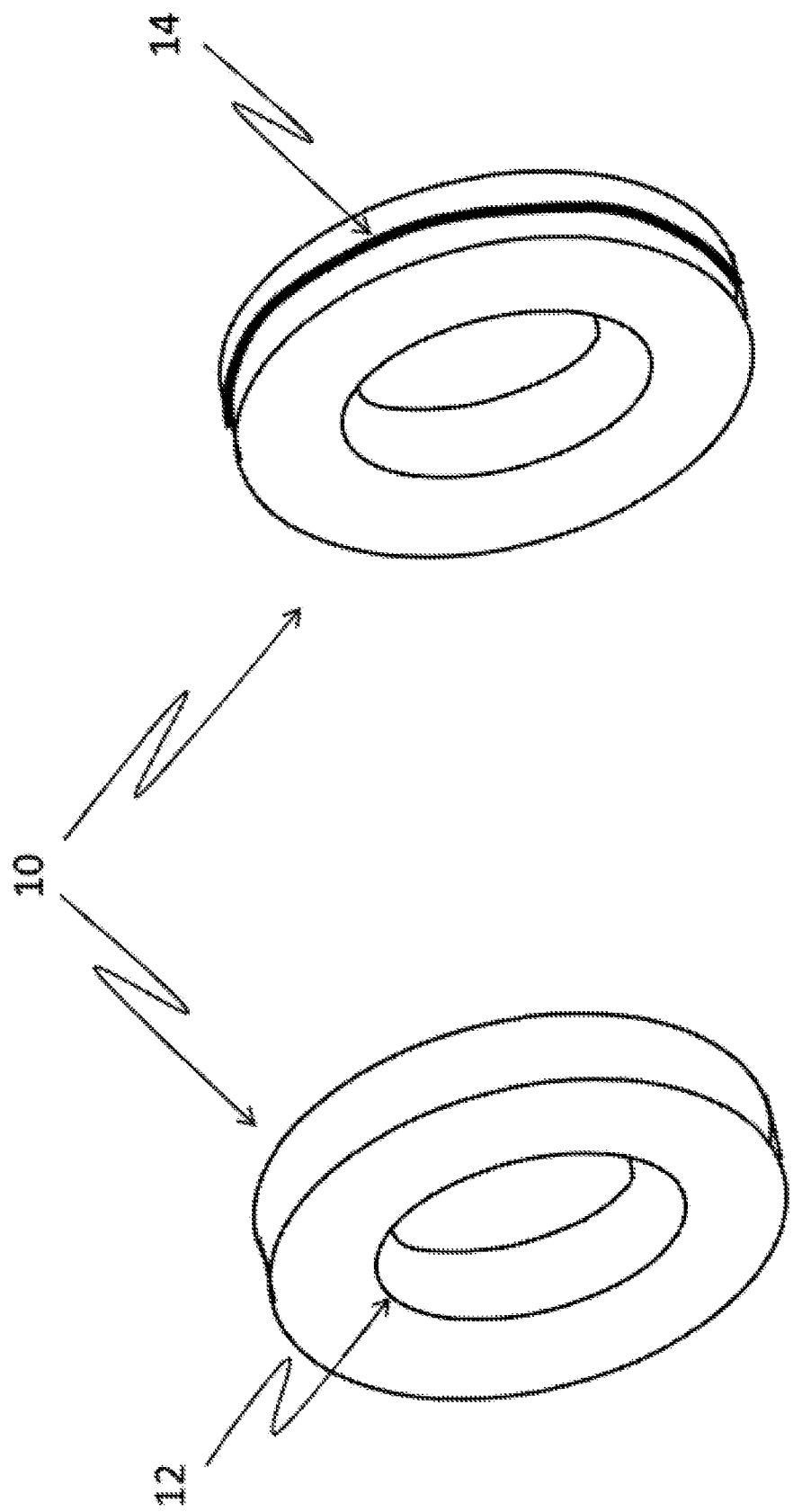
FIG. 1 is an isometric view of molding rings used in the molding of complex shapes.

For the purposes of promoting an understanding of the principles of this disclosure, reference is made to selected embodiments illustrated in the drawings and specific language will be used to describe the same. It will nevertheless be understood that no limitation of the scope of the disclosure is hereby intended; any alterations and further modifications of the described or illustrated embodiments, and any further applications of the principles of this disclosure as illustrated herein are contemplated as would normally occur to one skilled in the art to which this disclosure relates. At least one embodiment of this disclosure is shown in great detail, although it will be apparent to those skilled in the relevant art that some features or some combinations of features may not be shown for the sake of clarity.

Any reference to "disclosure" within this document is a reference to an embodiment of a family of embodiments associated with this disclosure, with no single embodiment including features that are necessarily included in all embodiments, unless otherwise stated. Furthermore, although there may be references to "advantages" provided by some embodiments of the present disclosure, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein. Such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

In the field of machining and machine shops, parts are fabricated using machine tools such as mills and lathes. For a turning operation, lathes are used, and a long bar stock is fed into what is known as a spindle. The spindle, being a larger diameter to accommodate large diameter bar stocks, is used to guide and clamp the bar stock to perform machining work on it. When small bar stock is required (e.g., for smaller diameter parts), a spindle liner may be used inside the spindle to take up the space between the bar stock and the inside diameter of the spindle. Various techniques and materials are used for spindle liners, and one such material, urethane, is advantageous as it can be cast molded into complex shapes to accommodate complex bar stock shapes.

Plastic injection molding is a technique for the fabrication and production of various complex shaped parts. Virtually any type of polymer can be used for plastic injection which provides a very rigid, high strength technique for part design and fabrication. Plastic injection molding requires a part design to be rather thin; wall thicknesses>0.200 inches are usually not desirable because the plastic, which is heated and liquefied, is forced under very high hydraulic pressures into a steel mold. As the plastic is forced into the mold, and even though the mold is being heated, the plastic cools. When the part formed from the cooled plastic is demolded, voids of material or "sink marks" are present. This leads to weakened parts and inconsistent moldability. Therefore, what is needed is a better approach to address these issues.

In the case of spindle liners used for machining, whose design is to provide a bulk material between a smaller bar stock and the larger inside diameter of a rotating lathe spindle, plastic injection is not practical, as a plastic injection molded part cannot be molded consistently for thicknesses greater than 0.200 inches. Moreover, the polymer materials used in plastic injection molding can be difficult to control and can evidence embrittlement and incipient cracks due to various pressures, temperatures, and state (dryness) of raw polymeric material. This could lead to a premature failure of an injection molded spindle liner if one could be contemplated to permit thin-wall molding.

The techniques and apparatuses disclosed herein provide a far better approach to molding spindle liners using a cast molding technique with a urethane and catalyst to precisely control the reactions based on part geometry. By using a cast molded part with a catalyst reaction, part geometry, particularly thickness, has no limit. Parts as thick as several feet can be cast molded using the various methods and apparatuses disclosed in this disclosure.

Referring first to FIG. 1, a mold ring 10 is shown with a round interior mandrel feature 12 and elastomeric sealing ring 14. The mold ring 10 comprises an exterior surface and an interior surface which can also be called a bore. In some implementations, the interior surface of the mold ring 10 is fabricated to fit the shape of an exterior surface of a mandrel.

In one implementation, the mold ring 10 can be fabricated from a metal and could have an interior surface shaped in various ways, e.g., round, hexagonal, square, etc. For example, mold ring 10 can be fabricated from aluminum and could have a round or a hexagonal interior surface based on a round or hexagonal surface of an interior mandrel (e.g., interior mandrel 28 of FIG. 3). Additionally, the bore (i.e., the interior surface) of mold ring 10 is substantially parallel to a cavity comprised in the casting mold 20 of FIG. 2 when inserted into the cavity of the casting mold 20. Elastomeric sealing ring 14 can provide a compliant circumferential sealing surface that is between 0.020 inches and 0.070 inches over the diameter of mold ring 10.

Figure 2:
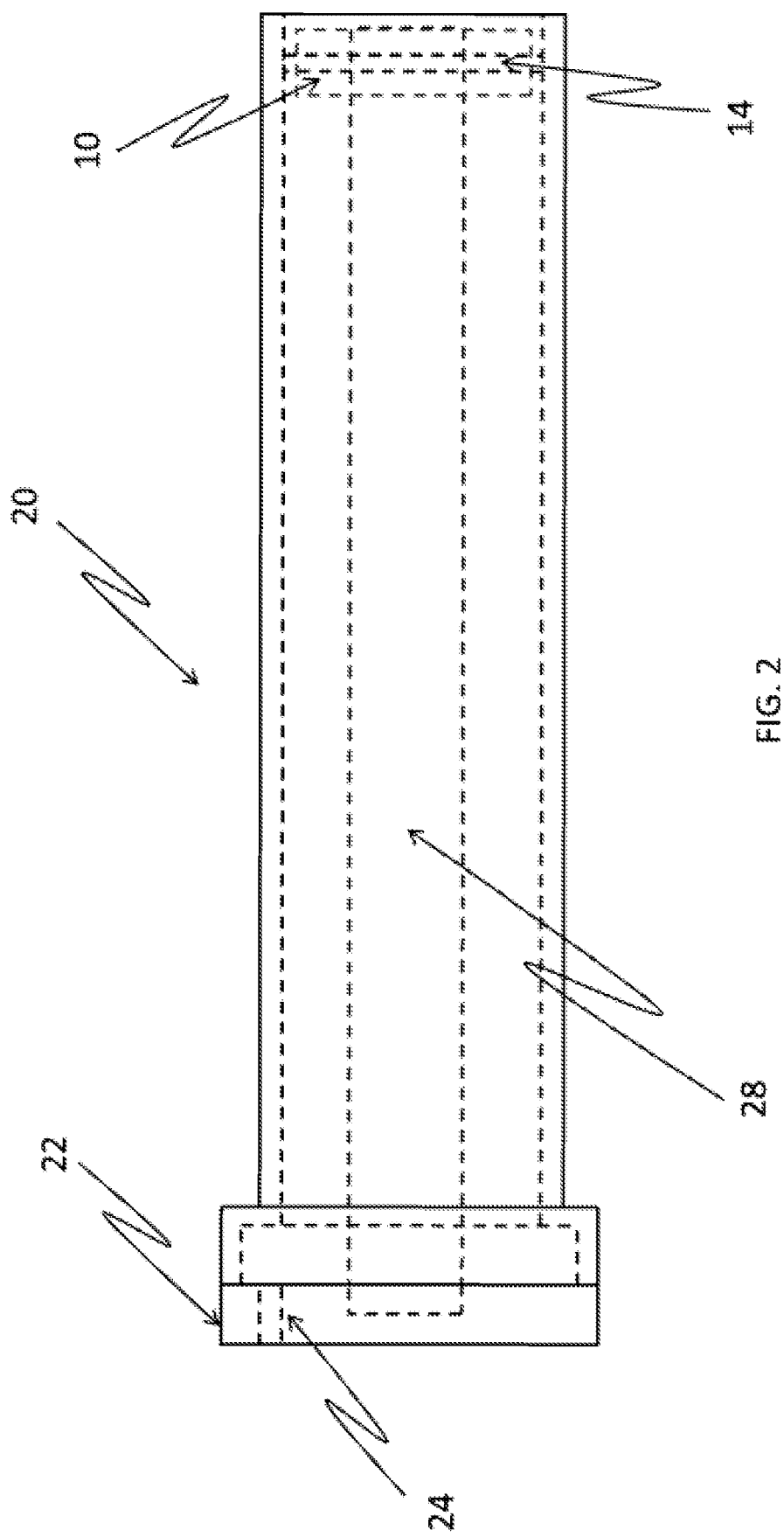
FIG. 2 is a sectional view of a complex shaped mold with a cap, mold tube, length shape length adjuster, and interior mandrel.

Shown best in FIG. 2 is a casting mold 20, together with the mold ring 10, elastomeric sealing ring 14, interior mandrel 28, mold cap 22, and air vent 24. The mold ring 10 can be positioned at any point located anywhere inside the casting mold 20 which allows any length of complex molded shape length to be molded. Structurally, the casting mold 20 comprises an exterior surface 26 (see FIG. 3), an interior surface (or inside diameter surface), an inside through cavity (i.e., mold cavity), and a fill-port through which a casting material is injected into the casting mold 20.

In one embodiment, the fill-port is fabricated at the mold cap 22. In other embodiments, the fill-port is fabricated at the bottom of the casting mold 20 close to the mold ring 10. In some instances, the fill-port is fabricated at a suitable location on the casting mold housing. In any case the location of the fill-port on the casting mold 20 is a design parameter that can be adapted based on for example, the mold application. It is appreciated that the casting material can be injected through the fill-port into the inside through cavity of the casting mold 20 under atmospheric pressure or, in some cases, under a specified pressure. For instance, some molded parts with very thin wall geometries can require specified pressures of up to 100 (pounds per inch) psi to force or inject the casting material into a space within the inside through cavity. In terms of fill-port sizes, the fill-port associated with the casting mold 20 can range between 0.125 inches to 0.50 inches in diameter, with the diameter being dependent on the overall part geometry of the shape to be molded. For example, a molded part with a total volume of 50-70 cubic inches can require a 0.125 inch minimum diameter fill-port while part geometry with a volume greater than 75 cubic inches but less than 120 cubic inches can require 0.25 inch diameter fill-port. In some embodiments, a part whose volume is greater than 120 cubic inches can require a 0.5 inch diameter fill-port.

In some embodiments, the casting material utilized is a catalyst-activated urethane which ideally has an exothermic temperature of 250 F-350 F. This exothermic temperature can cause the casting mold 20 to rise in temperature and expand due to the coefficient of thermal expansion (tce) of the casting mold 20. When poured or injected into the casting mold 20 via the fill-port, the urethane fills the space between the interior surface of the mold an exterior surface of interior mandrel 28. In some embodiments, casting mold 20 is fabricated from aluminum which has a tce of 11 ppm to 15 ppm. A resulting change of diameter on casting mold 20 with mold ring 10 inside of casting mold 20 is accounted for via the compression of elastomeric sealing ring 14. This compression allows for a tight seal between elastomeric sealing ring 14 and the interior surface of the casting mold 20. That is to say that the elastomeric sealing ring 14 is configured to seal a space between the interior surface of the casting mold 20 and an exterior surface of the mold ring 10 during the molding of the casting material. In some implementations, casting mold 20 is heated or pre-heated to 150 F-200 F in order to allow urethane to maintain a desired exothermic property during curing or the period time before the complex shape formed from the urethane is demolded. Although not necessary, the heating of casting mold 20 will prevent air voids in the final complex shape. In some further embodiments, the base urethane material to catalyst is ideally 90%-92% by volume. It is appreciated that "a complex shape as used in some embodiments, refers to the molded object formed from the casting material. In other instances, complex shape, molded object (simply object elsewhere herein), molded part, and mating part are used interchangeably.

Figure 3:
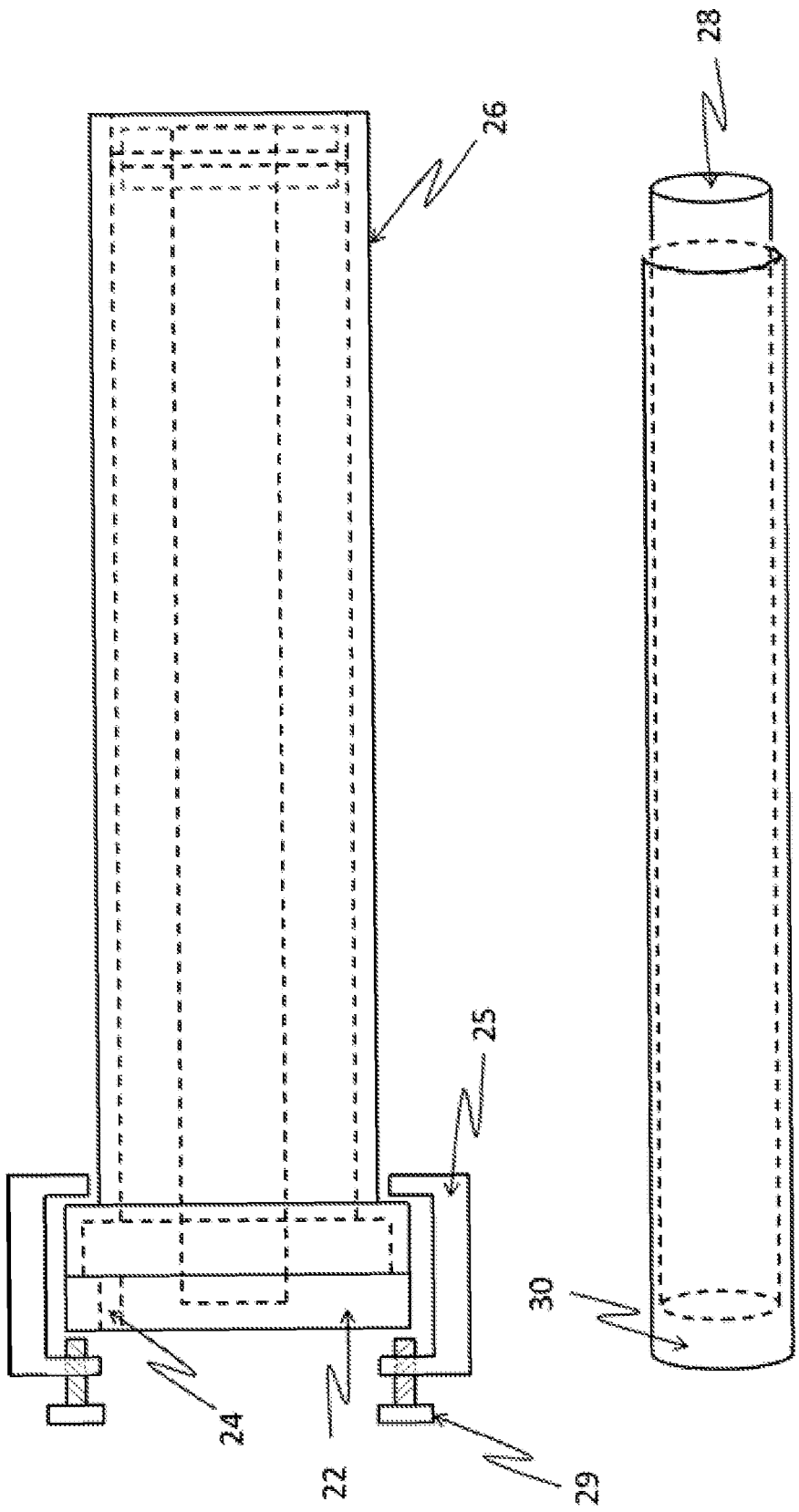
FIG. 3 is a sectional view of a complex shaped mold as depicted in FIG. 2 with a mandrel coating technique.

As best shown in FIG. 3, casting mold 20 has interior mandrel 28 supported and centered by mold ring 10 and mold cap 22. In some instances, mold cap 22 may be called end cap 22 or simply a cap 22. The mold cap 22 can be fabricated from a material (e.g., metal) that is heated and pressed onto an object (e.g., cylindrical object or mold object) resembling the shape of casting mold 20. In one embodiment, the object is casting mold 20. In other embodiments, the object is a metallic object having at least features substantially similar to a surface that the mold cap 22 covers on casting mold 20. In some instances, the design of casting mold 20 is based on the object. Additionally, the object may comprise steel while the mold cap 22 may comprise aluminum. In one embodiment, mold cap 22 comprises an interior surface that is substantially perpendicular to the opening of the interior cavity of the casting mold 20. This allows, the mold cap 22 to be attached to casting mold 20 using end clamps 25 and jacking screws 29. Additionally, air vent 24 may be fabricated inside mold cap 22 and can be between 0.010 inches to 0.060 inches in diameter. This diameter range of air vent 24 is suited for urethane with a viscosity between 10,000 and 50,000 centipoise (cP). In some embodiments, a smaller diameter of air vent 24 would be utilized with lower viscosity urethane (10,000 cP) while a larger air vent 24 diameter would be utilized with a higher viscosity urethane (50,000 cP).

Interior mandrel 28 is ideally the raw bar stock material which will be machined in a machine center/turning lathe in the future. In some implementations, interior mandrel 28 may be simply referred to as bar stock/raw bar stock/ mandrel. Interior mandrel 28 can assume a plurality of shapes and sizes depending on the application. In one embodiment, interior mandrel 28 can be inserted into the mold cavity to create a space associated with a multidimensional shape. This multidimensional shape could be based on at least a shape of an exterior surface of the interior mandrel 28, and/or on the shape of the interior surface of the casting mold 20, and or the shape of the interior surface of the mold ring 10. Due to casting material (urethane) shrinkage, interior mandrel 28 is either machined to a larger diameter, or, a removable sleeve 30 is added to interior mandrel 28 before molding a complex shape to compensate for the urethane shrinkage. In one embodiment, removable sleeve 30 is a clearance cover wrapped around the mandrel 28 to maintain a specific clearance space between the mandrel and the interior surface associated with casting mold 20. For instance, when removable sleeve 30 is wrapped around the mandrel and the mandrel is inserted into the cavity of casting mold 20, the specific clearance space between the mandrel 28 and the interior surface associated with casting mold 20 can range between 0.020 inches to 0.040 inches to compensate for casting material shrinkage after molding. Removable sleeve 30 can be a polymer or olefin coating such as heat shrink tubing or spray adhesives.

In some embodiments, the outside diameter of interior mandrel 28 can be 0.020 inches to 0.050 inches thicker than the raw bar stock material to account for the urethane shrinkage after molding. That is to say that because of urethane shrinkage after molding a particular complex shape associated with the raw bar stock, the volume of space occupied by the interior mandrel 28 can be increased prior to molding the particular complex shape by either using a removable sleeve 30 and/or machining/structuring/configuring the raw bar stock to obtain a suitable interior mandrel 28 compatible with the complex shape to be molded. The term "compatible" as used means that the mandrel is of a size and/or shape needed to mold a complex shape or object that can be used as a spindle liner and/or hush tube for a raw bar stock similar to, and/or associated with the mandrel 28. In some instances, the term "compatible mandrel" is used to refer to a mandrel of size and shape used to create a multi-dimensional shape within the mold such that an object molded (e.g., complex shape) from the multi-dimensional shape can be used as a spindle liner and/or hush tube for bar stocks of different shapes and sizes than the shape and size of the mandrel as illustrated in FIGS. 12-16. In other embodiments, machining various shaped bar stocks which are 0.020 inches to 0.050 inches thick in all dimensions facilitates generating a suitable interior mandrel 28 for molding of a plurality of complex shapes.

Figure 4:
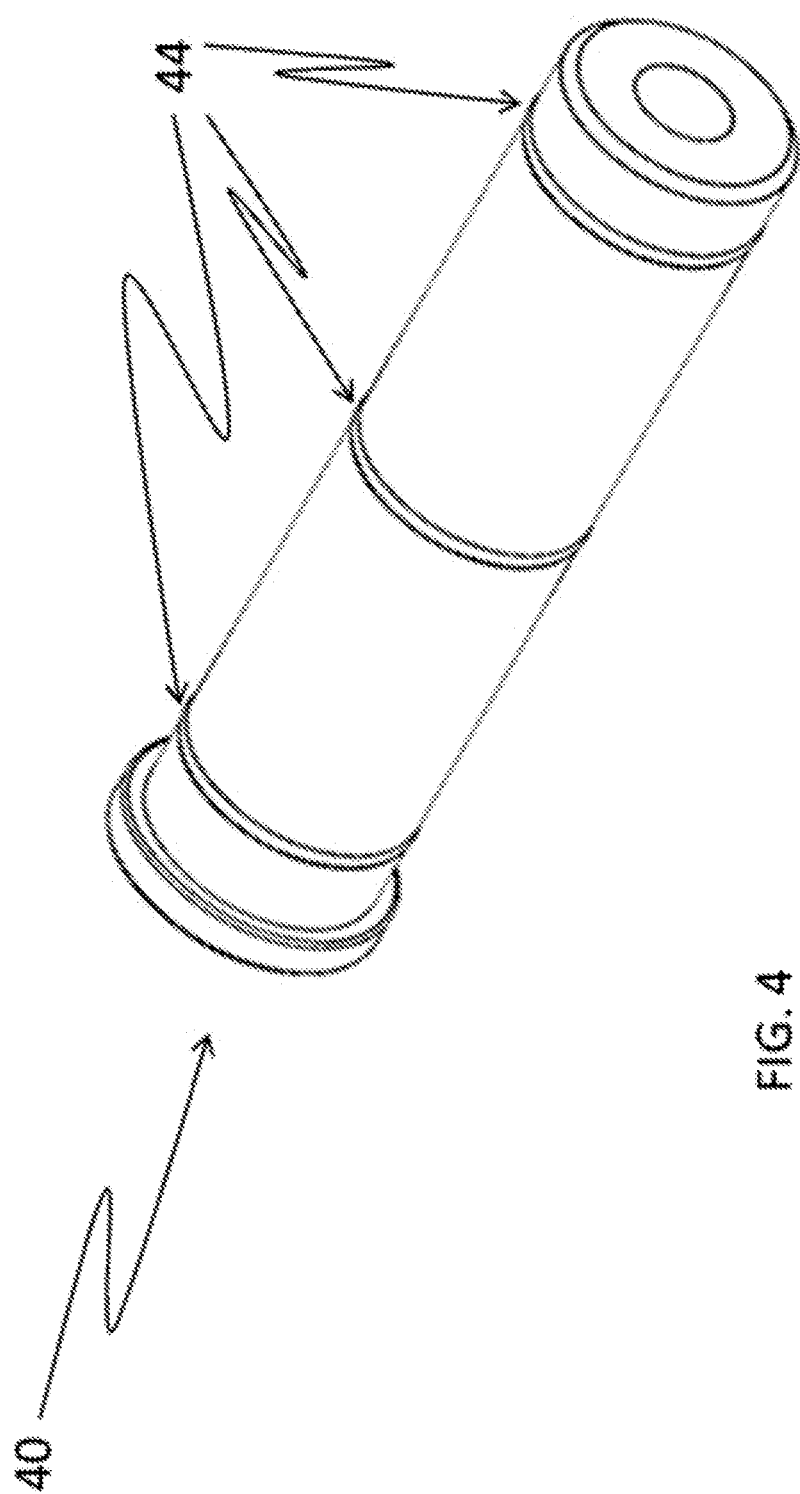
FIG. 4 is an isometric view of a complex shape post molding using the methods and apparatuses to mold complex shapes.

Referring now to FIG. 4, complex shape 40 is demolded and sealing grooves 44 are subsequently machined into its outside diameter. Demolding in this context refers to removing the actual cast molded part, which in this case is complex shape 40, from the casting mold 20 after molding. That is to say that using the casting mold 20 of FIG. 2 with an interior mandrel 28 having a round exterior surface, liquid urethane can be injected into casting mold 20 and after it cures, complex shape 40 is formed is subsequently removed from casting mold 20 by a demolding process.

Figure 5:
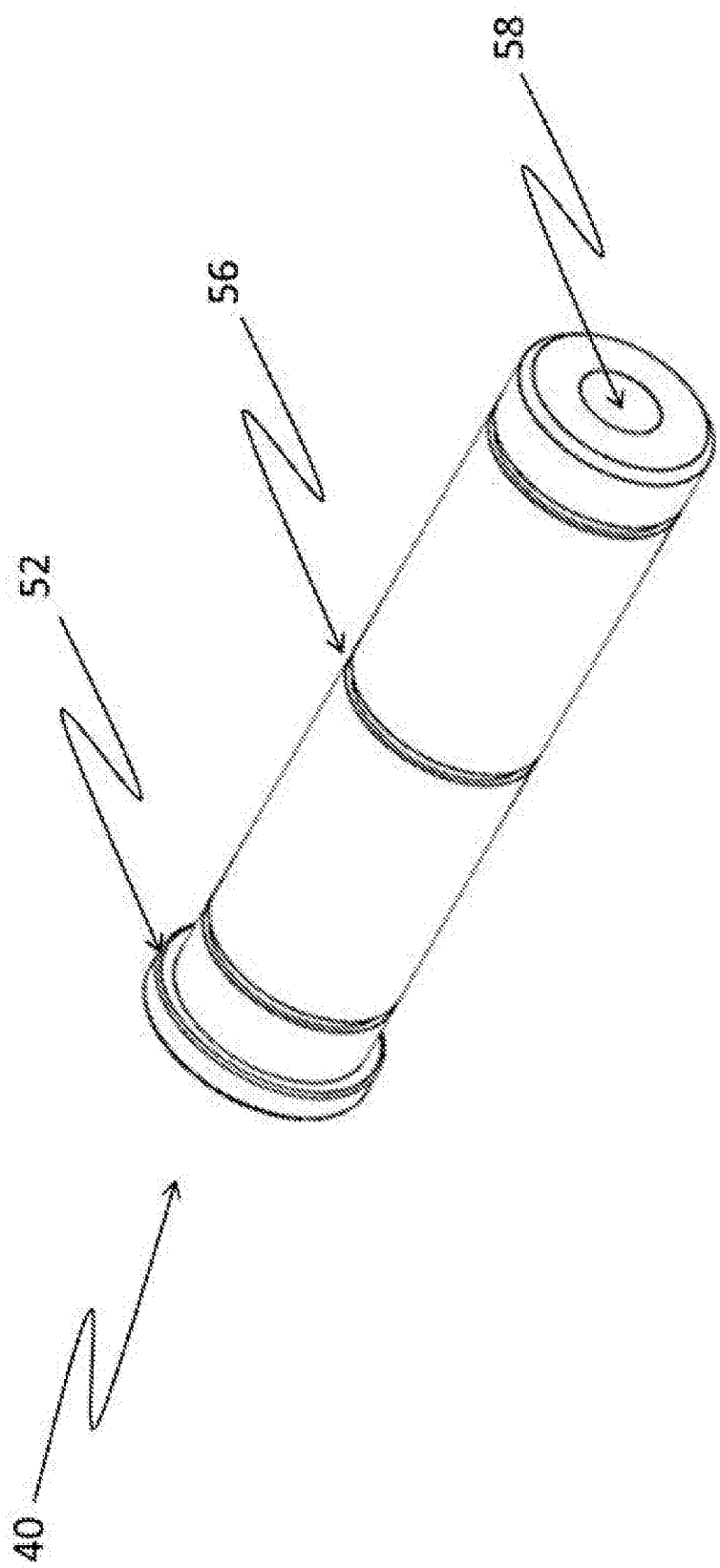
FIG. 5 is an isometric view of a complex shape as depicted in FIG. 4 with elastomeric o-rings installed circumferentially.

As best shown in FIG. 5, complex shape 40 has elastomeric seals 56 attached into sealing grooves 44 of FIG. 4. Additionally, end flange 52 may be used as a molded stop while complex shape 40 interior through cavity 58 is further molded to allow a given bar stock to slip through or fit the through cavity 58. End flange 52 may be configured to be placed at a boundary between the end cap 22 and at least a portion of the opening of the inside through cavity of the casting mold 20. In some instances, the air vent 24, discussed in association with end cap 22, extends into the flange. Furthermore, end flange 52 can be fabricated from a metalized material having a tce substantially equivalent to the tce used to fabricate the casting mold 20.

Figure 6:
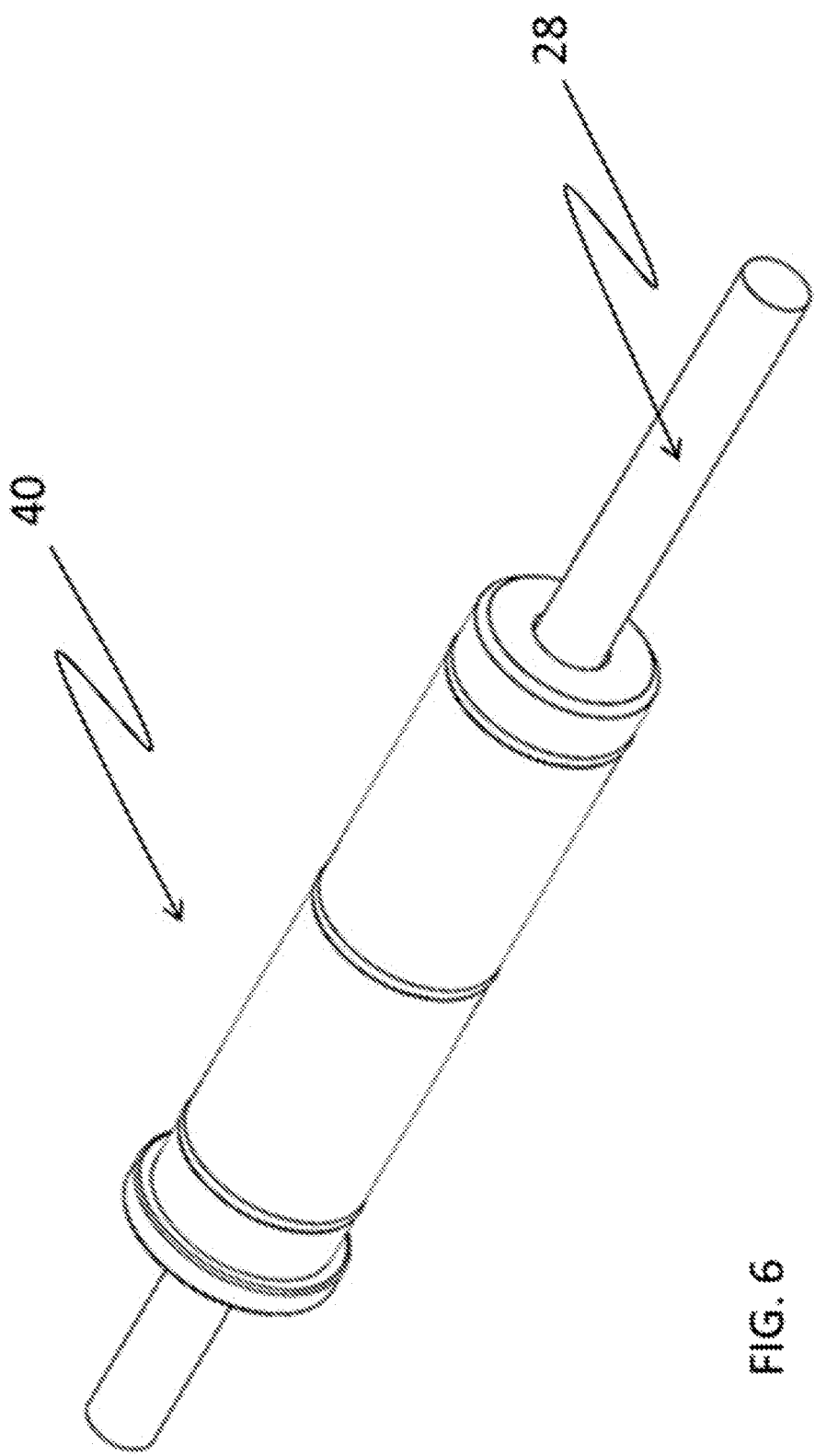
FIG. 6 is an isometric view of a molded complex shape with an interior molding feature present within the complex shape.

FIG. 6 depicts complex shape 40 with round bar stock 61 running through complex shape 40 for a turning (lathe) application. In some embodiments, a turning application refers to an application for machining parts that require rotational motion of the bar stock, which in this case is round bar stock 61. Some turning applications include screw machining, shaft machining, solid cylinder fabrication, hydraulic cylinder machining, precision rod fabrication, and the like.

Figure 7:
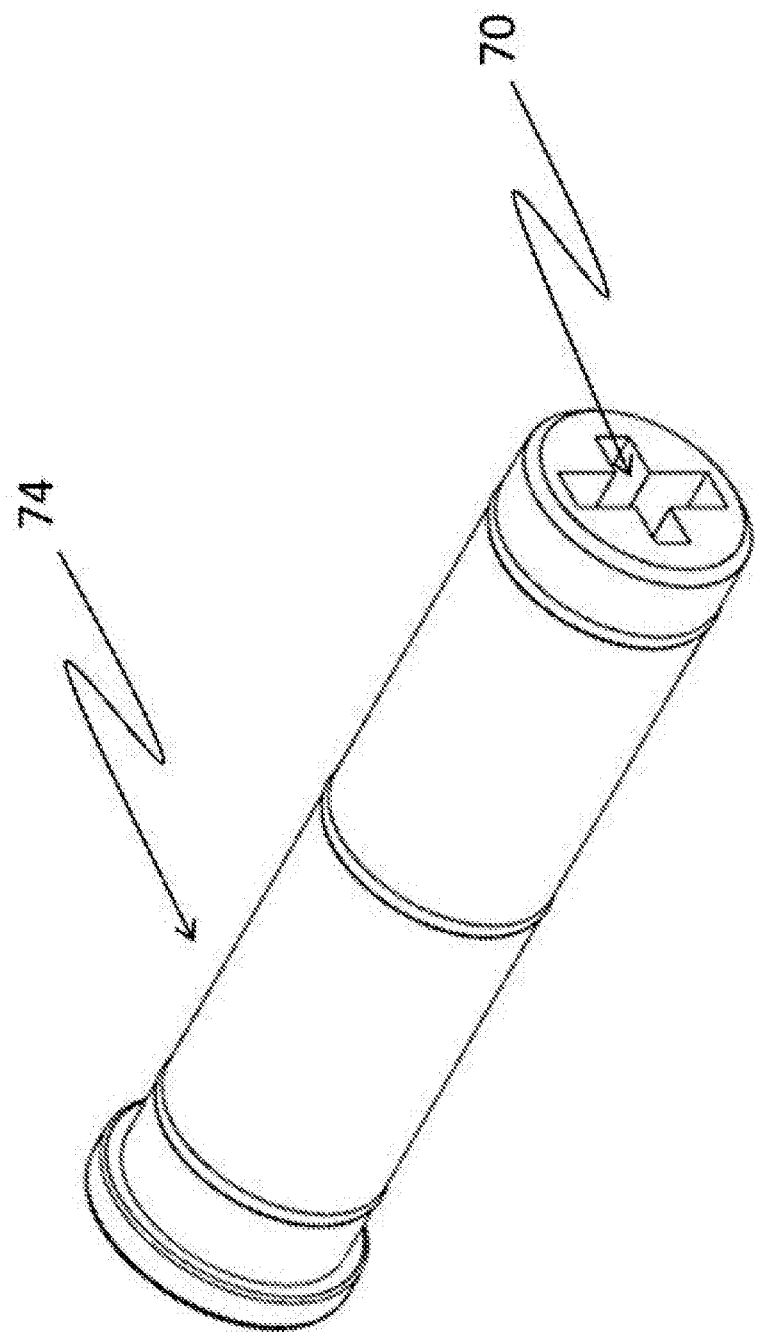
FIG. 7 is an isometric view of a molded complex shape with a cross-hatched interior feature post molding.
Figure 8:
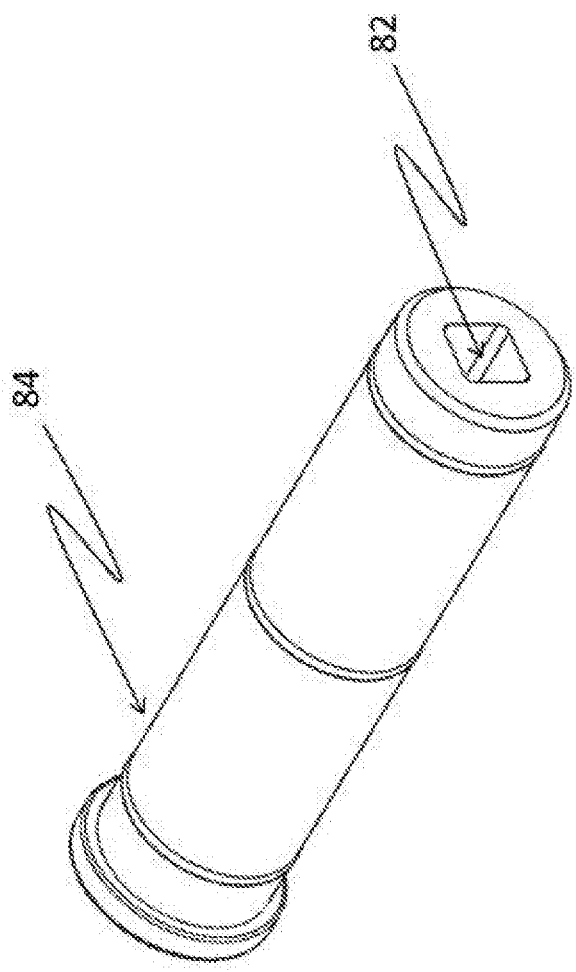
FIG. 8 is an isometric view of a molded complex shape with a square interior feature molded in post molding using methods and apparatuses to mold complex shapes.
Figure 9:
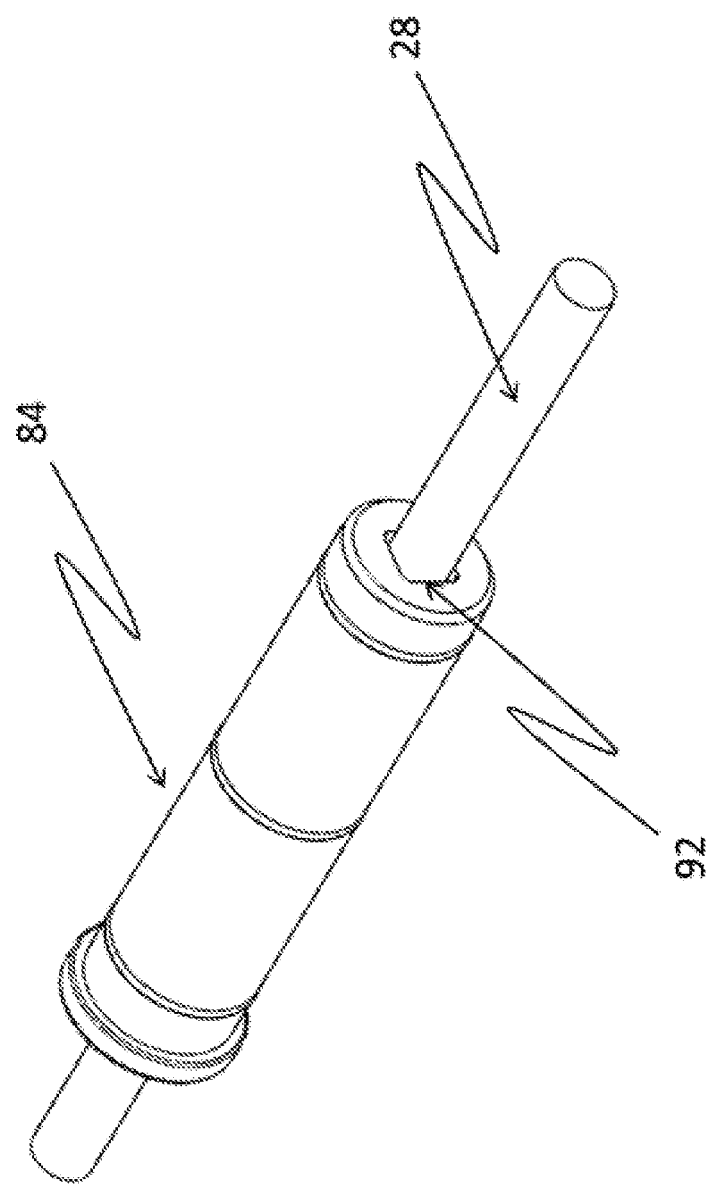
FIG. 9 is an isometric view of a molded complex shape with a round rod inside a molded feature in the shape of a square.
Figure 10:
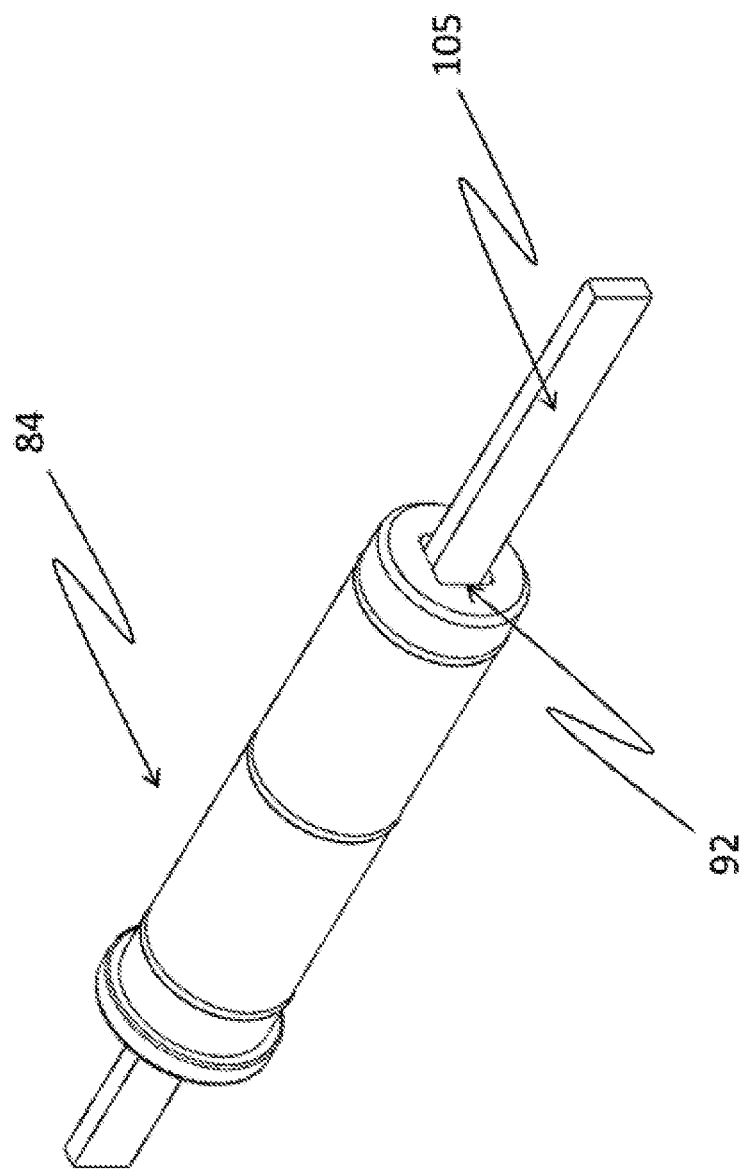
FIG. 10 is an isometric view of the complex shape in FIG. 6 with a flat rectangular rod inside a molded feature in the shape of a square.

FIG. 7 depicts yet another complex shape 74 with cross interior through cavity shape 70. It is appreciated that the interior through cavity shape 70 can be dependent on mold cap 22 and mold ring 10 being fabricated with an interior in a cross shape. FIG. 8 shows another molded complex shape 84 with an interior through cavity 82 molded into a shape of a square. FIG. 9 and FIG. 10 respectively depict round interior mandrel 28 and flat stock 105 fitting into interior through cavity 92.

Figure 11:
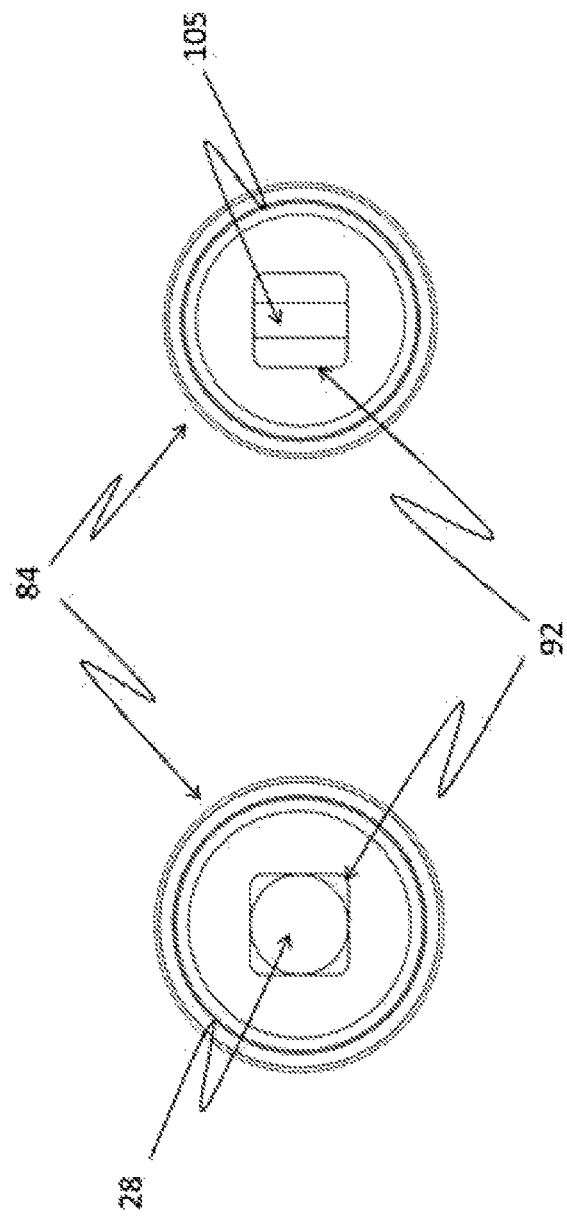
FIG. 11 is an end view of molded complex shapes from FIG. 9 and FIG. 10 depicting a round bar stock and a rectangular bar stock housed in the molded square feature.
Figure 12:
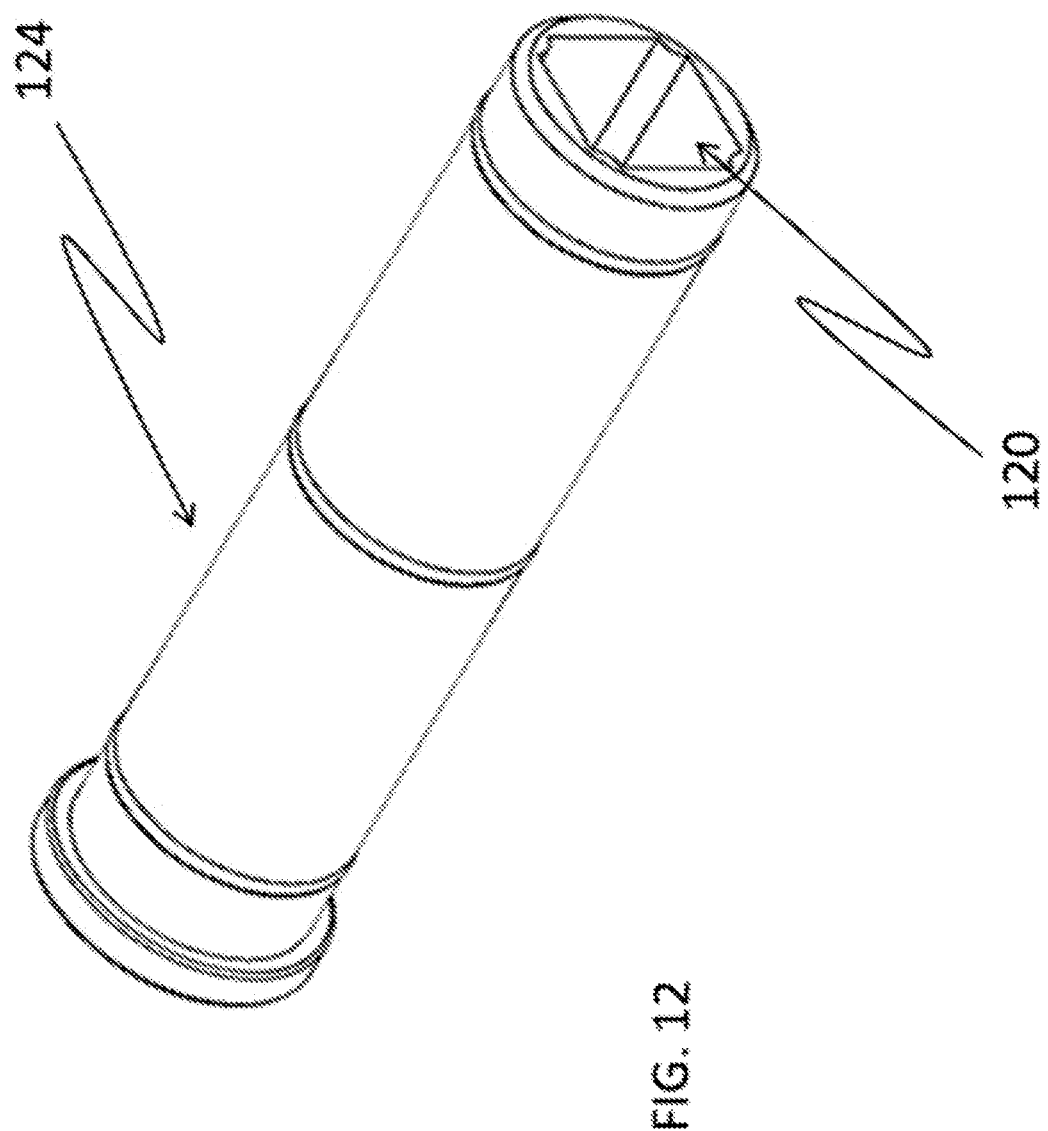
FIG. 12 is an isometric view of a molded complex shape with a multi-shaped interior channel molded in using methods and apparatuses to mold complex shapes.
Figure 13:
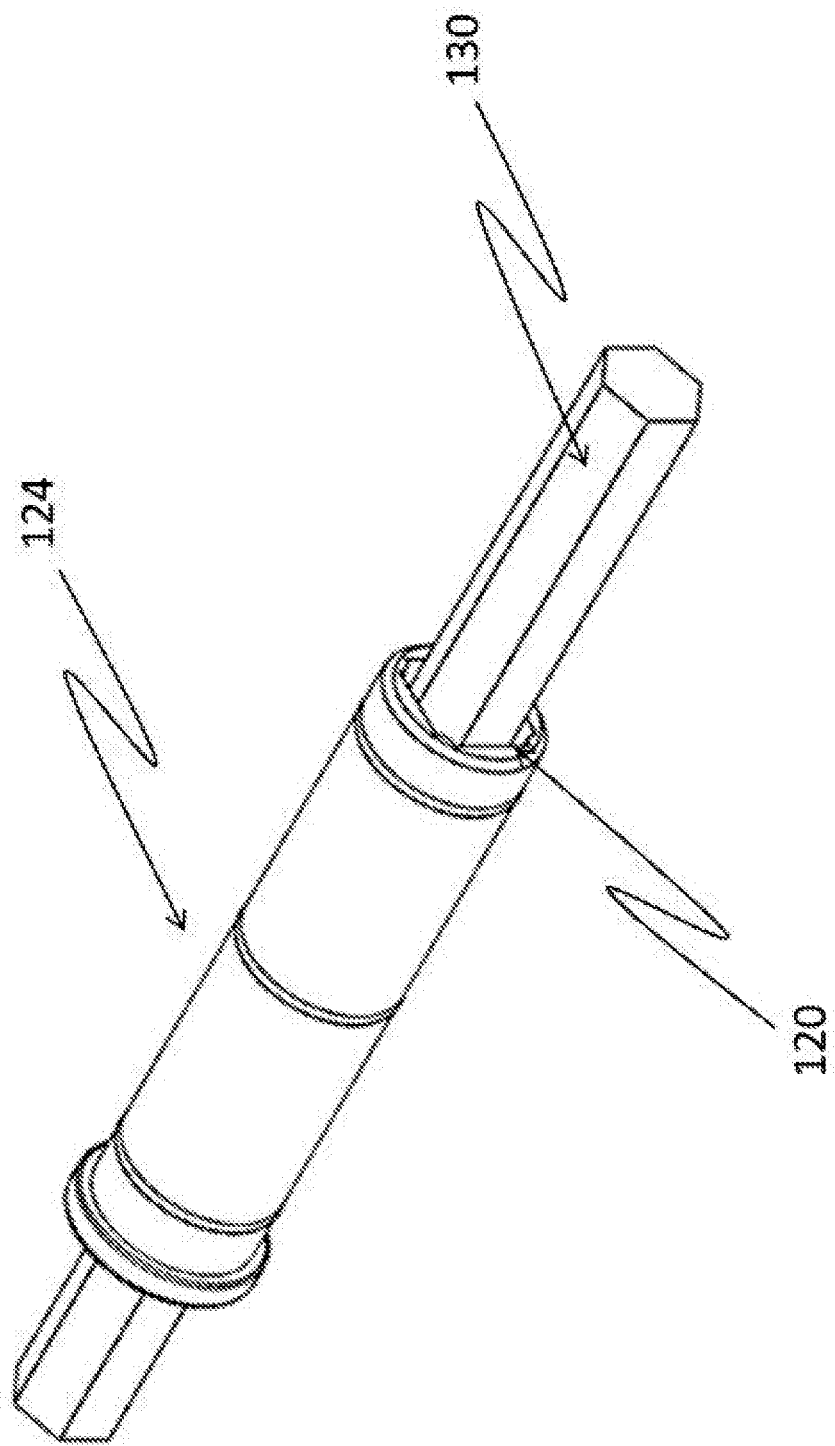
FIG. 13 is an isometric view of a molded complex shape with a multi-shaped interior as shown in FIG. 12 with a hexagonal bar stock housed in the multi-shaped interior.
Figure 14:
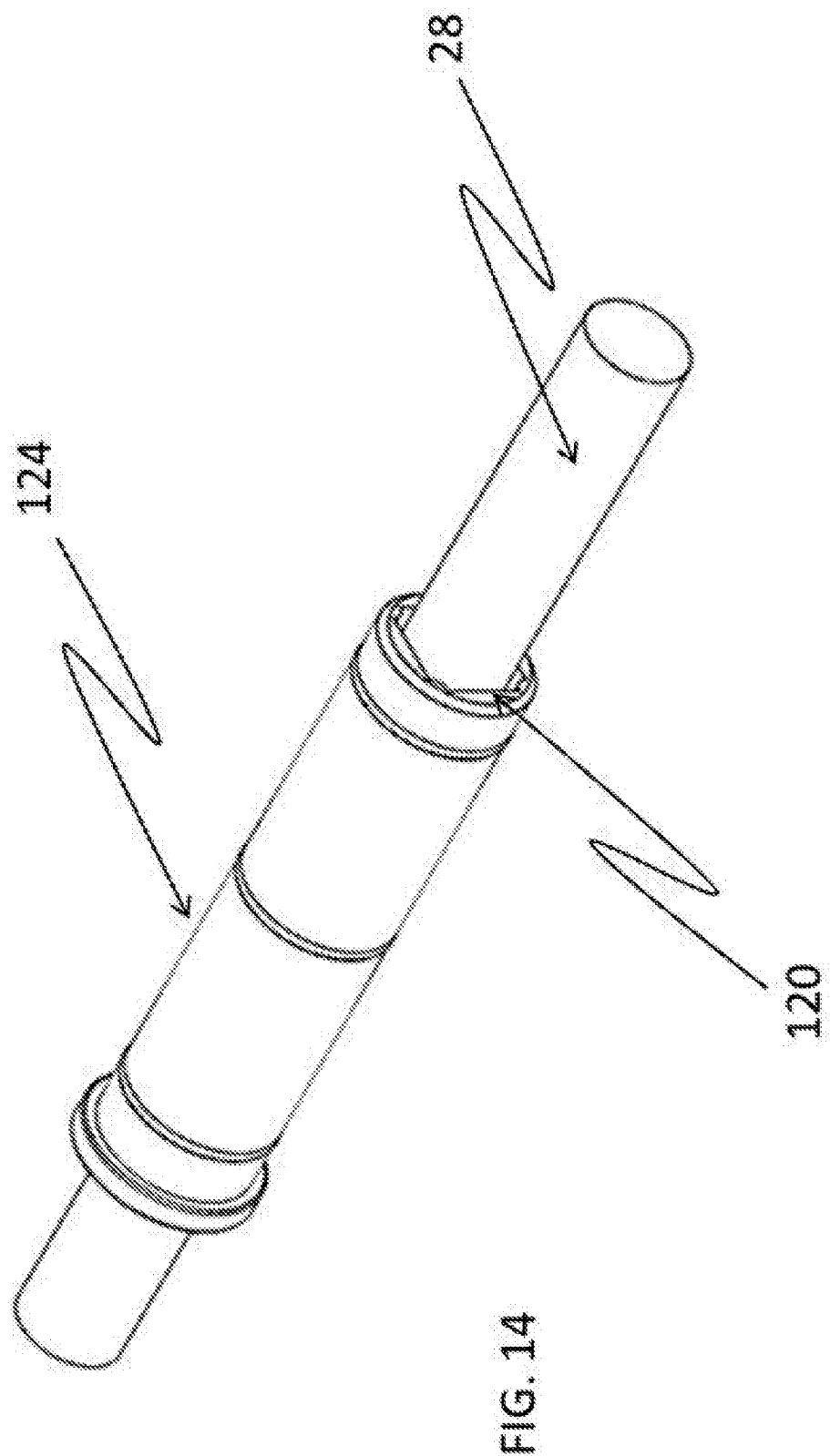
FIG. 14 is an isometric view of a molded complex shape as shown in FIG. 12 with a round bar stock housed in the multi-shaped interior.
Figure 15:
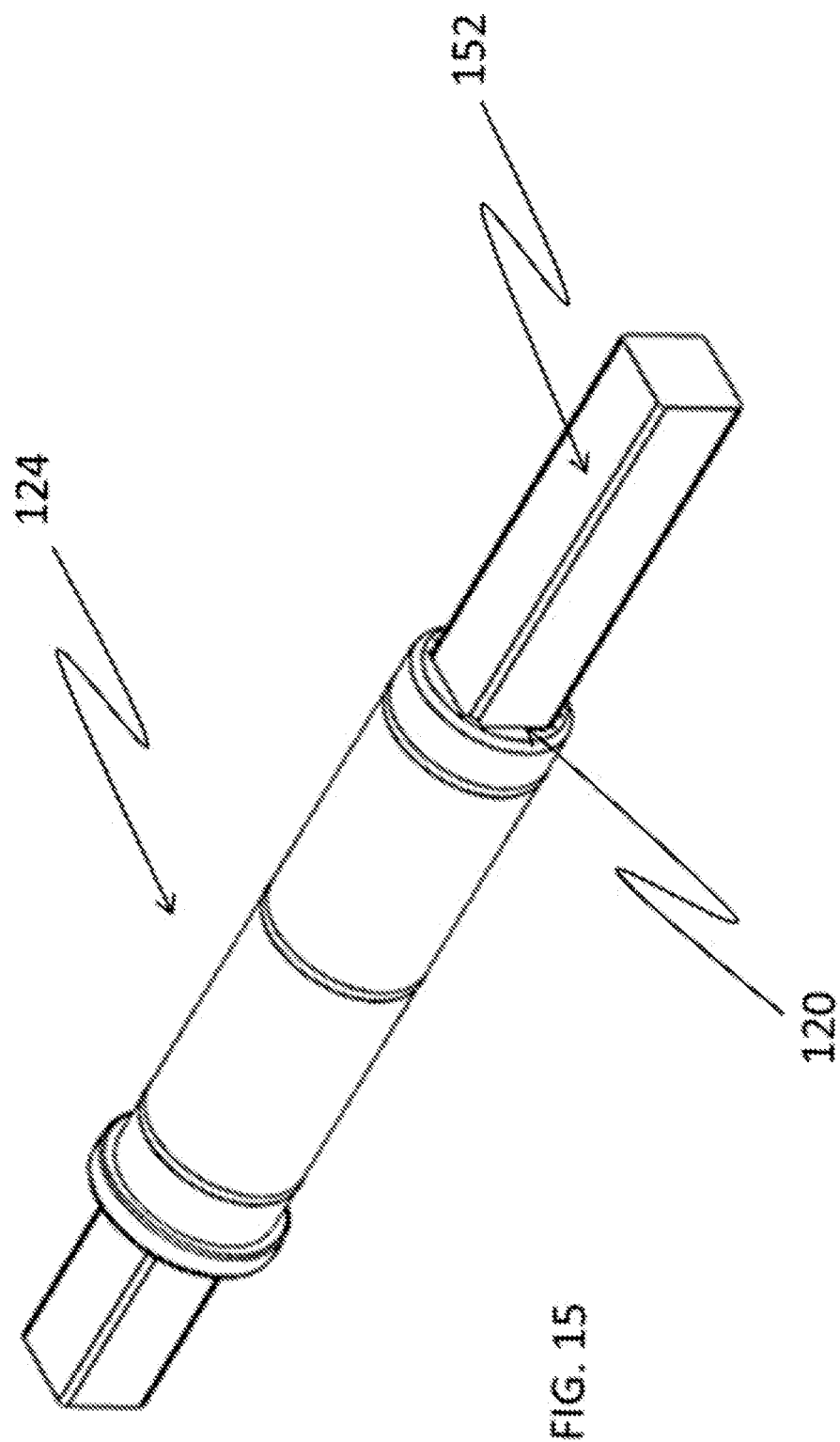
FIG. 15 is an isometric view of a molded complex shape with a multi-shaped interior as shown in FIG. 12 with a square bar stock housed in the multi-shaped interior.

FIG. 11 depicts an end view of a molded complex shape 84 with interior through cavity 92 molded into a shape of a square. The fitting of round interior mandrel 28 in the left view of FIG. 11 and rectangular bar stock 105 in the right view of FIG. 11 are examples of fitting configurations compatible with the through cavity 92 of the molded complex shape 84. Thus, the interior through cavity 92 can be adapted for use with different mandrel or bar stock shapes after the molding of a given complex shape 84 having the interior through cavity 92.

Figure 16:
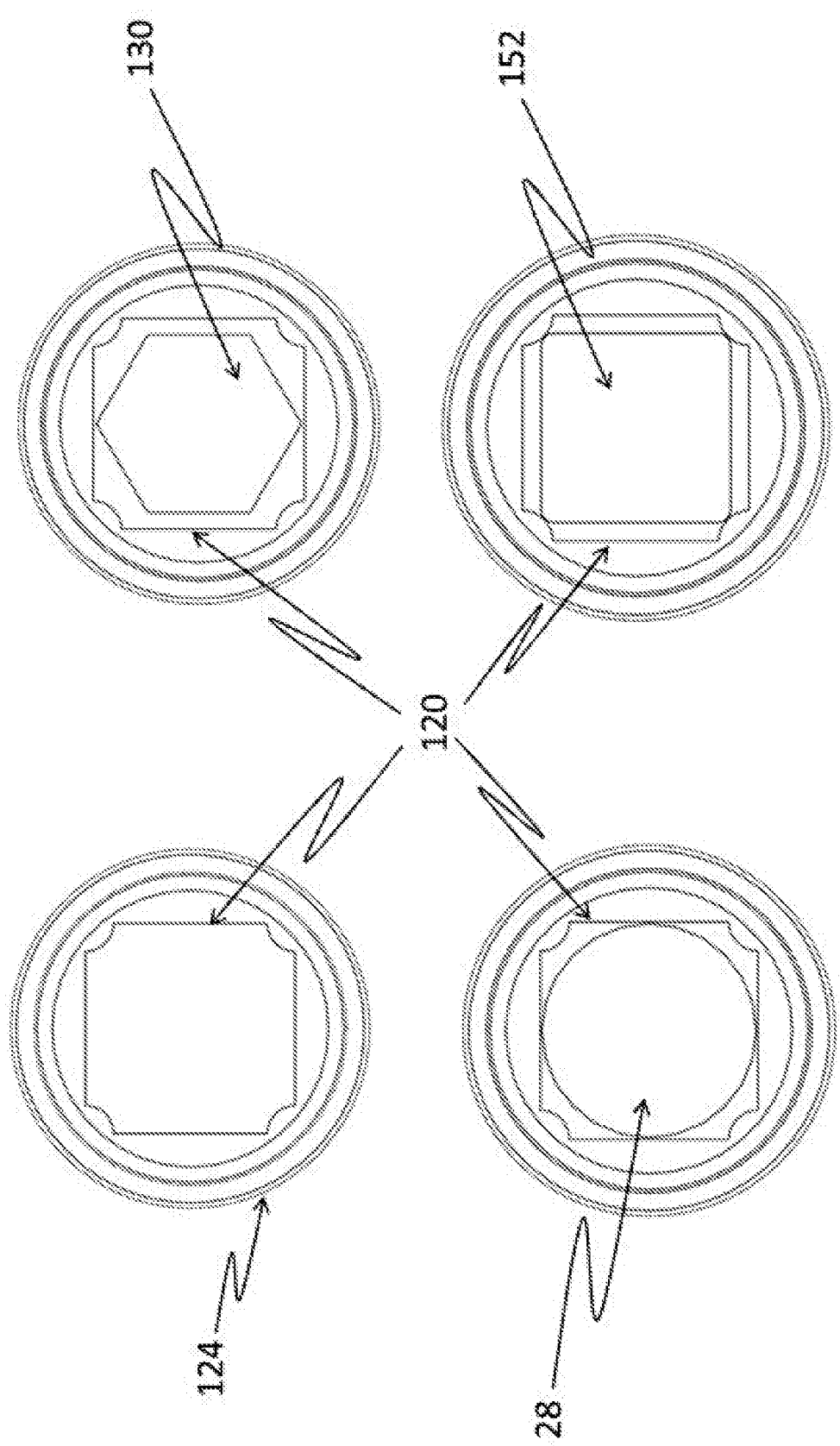
FIG. 16 is an end view of the molded complex shape with a multi-shaped interior as shown in FIG. 12 with the hexagonal stock, square stock, and round stock shown housed in the multi-shaped interior.

FIGS. 12-15 depict yet another molded complex shape 124 with square interior through cavity 120. Square interior through cavity 120 can accept hexagonal bar stock 130 (FIG. 13), round interior mandrel 28 (FIG. 14), and square bar stock 152 (FIG. 15) all with one common square interior through cavity 120. FIG. 16 depicts an end view of complex shape with square interior through cavity 120 and various bar stocks of FIGS. 13-15.

Figure 17:
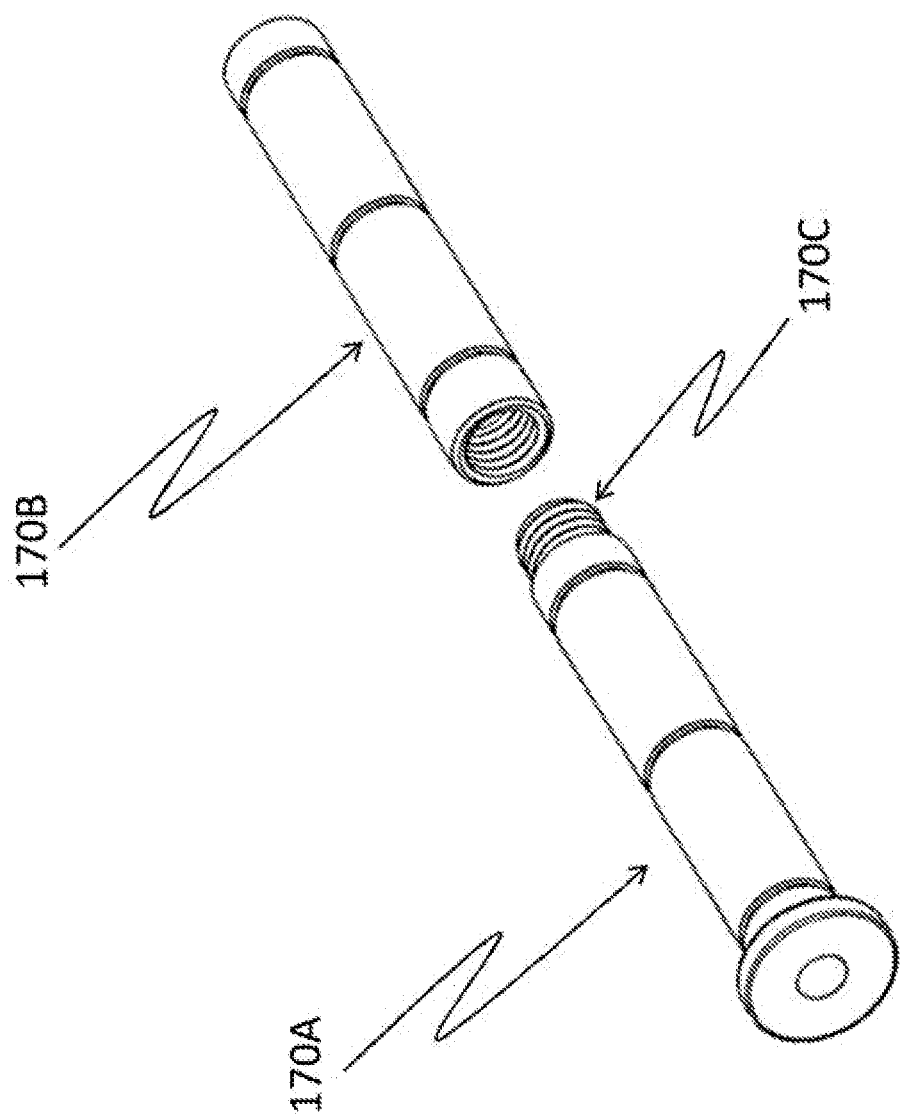
FIG. 17 is an isometric view of a molded complex shape with a technique to extend and attach with threads another complex molded shape using methods and apparatuses to mold complex shapes.

FIG. 17 depicts another molded complex shape molded into two sections, flange section 170A and end section 170B. Flange section 170A is molded with a mold ring 10 fashioned with a threaded interior mandrel feature (female threads). Section 170B is molded with a mold ring 10 fashioned with a threaded protrusion (male threads). Both flange section 170A and end section 170B are twisted together with threaded features 170C which allow a longer complex shape.

Figure 18:
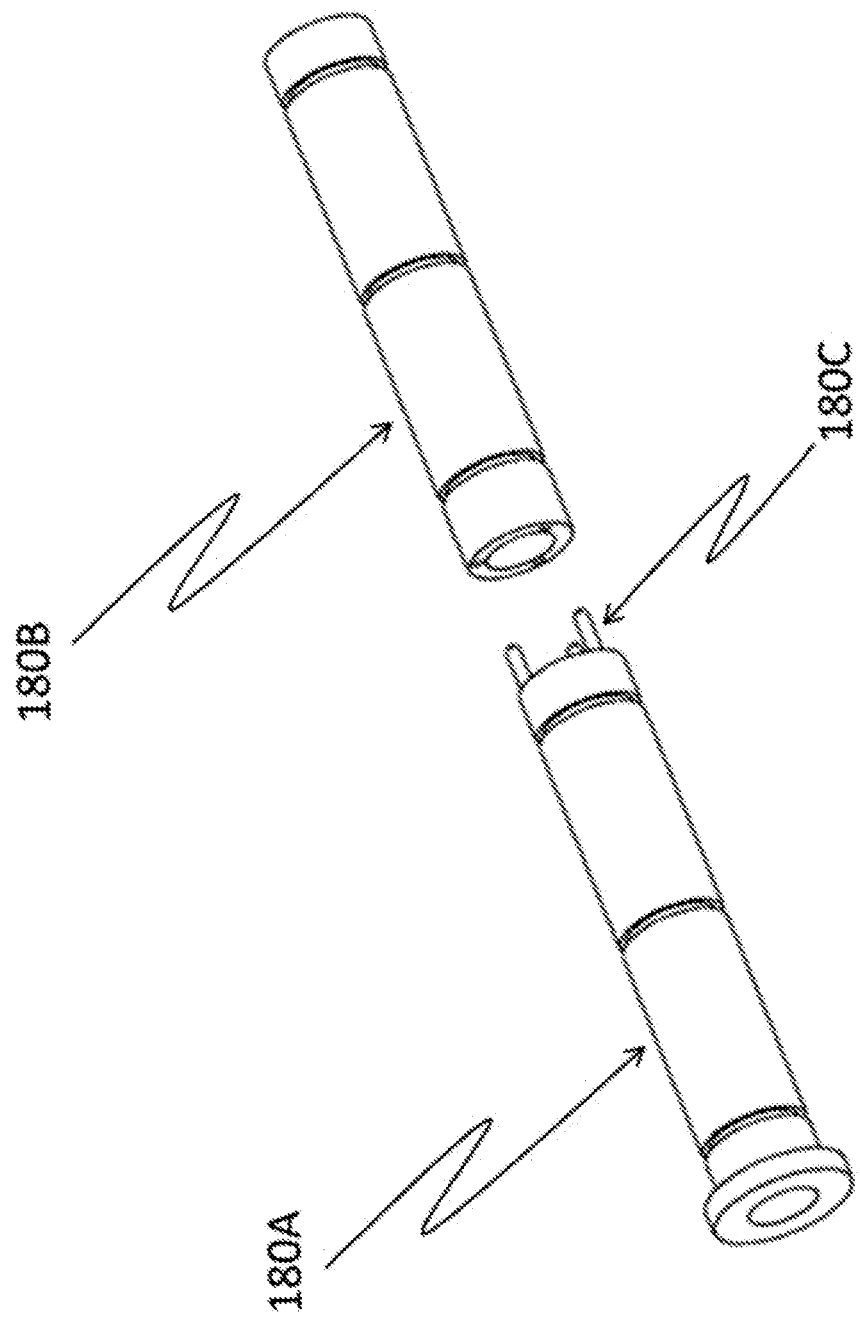
FIG. 18 is an isometric view of a molded complex shape with a technique to extend and attach with pinning another complex molded shape using methods and apparatuses to mold complex shapes.
Figure 19:
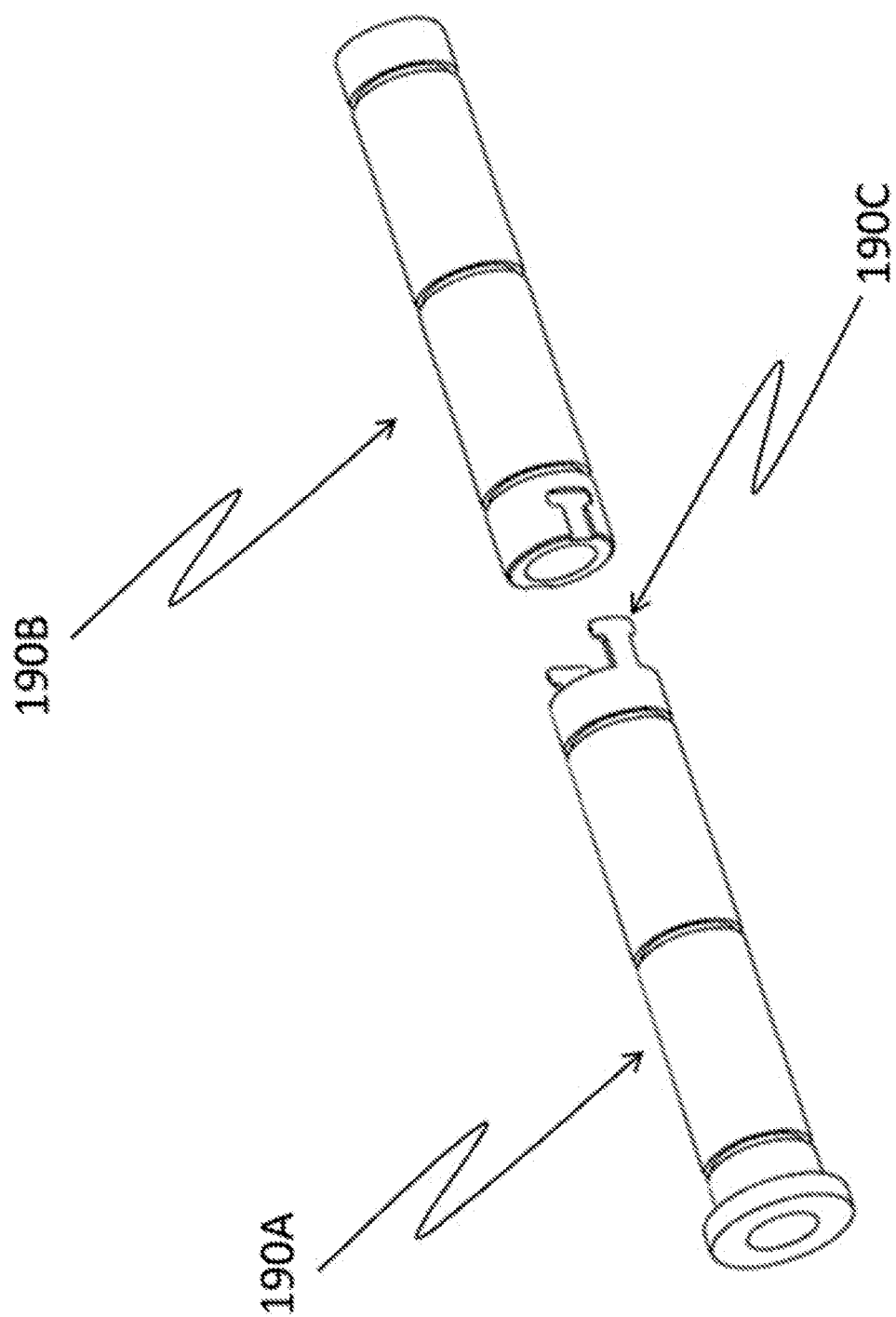
FIG. 19 is an isometric view of a molded complex shape with a technique to extend and attach with snaps to another complex molded shape using methods and apparatuses to mold complex shapes.

FIG. 18 and FIG. 19 depict other sectional molded complex shapes, with flange section 180A and 190A and end section 180B and 190B molded and connected vis-à-vis molded pins 180C and 190C.

Figure 20:
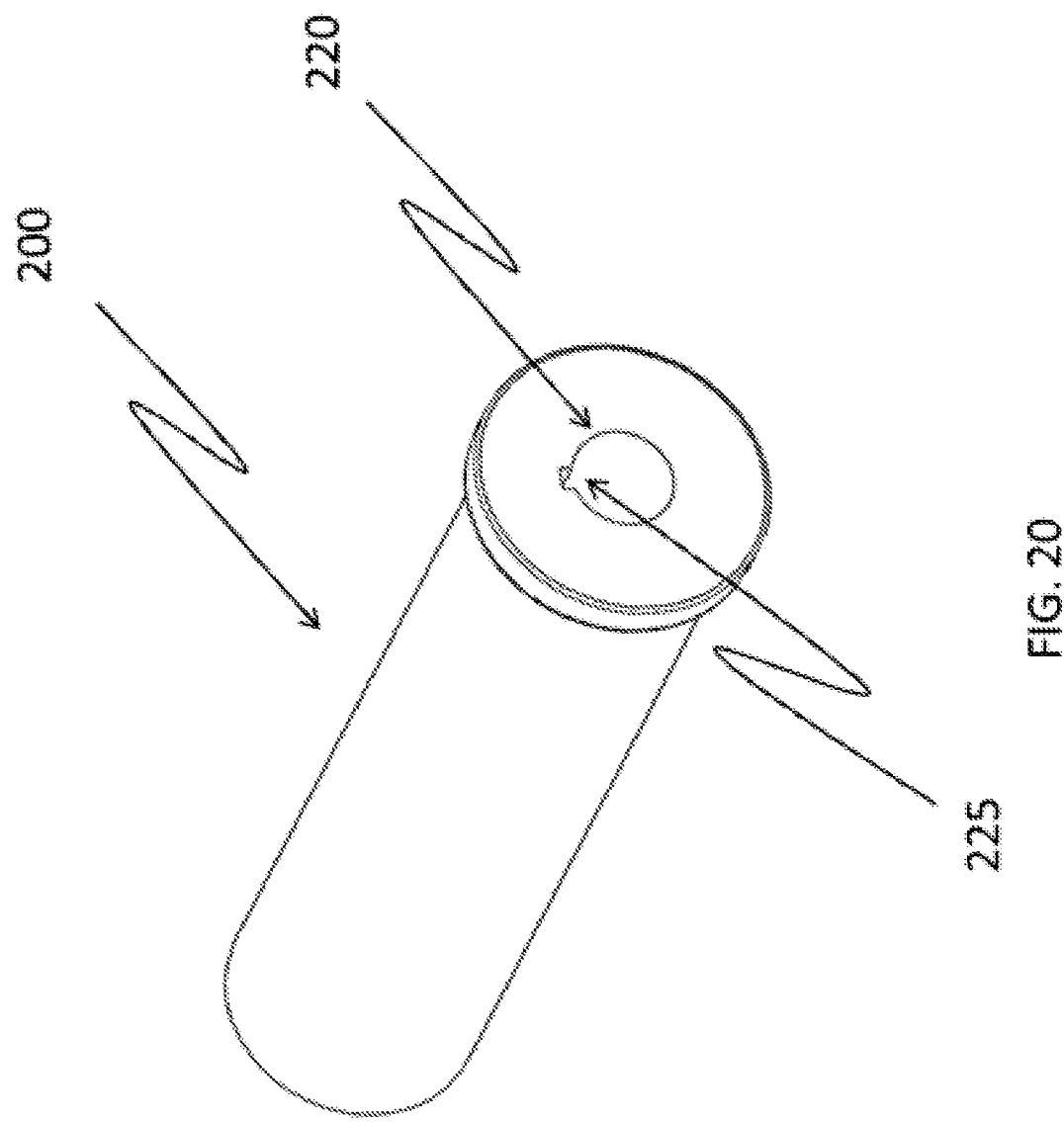
FIG. 20 is an isometric view of a molded complex shape with a notch post molding using the methods and apparatuses to mold complex shapes.
Figure 21:
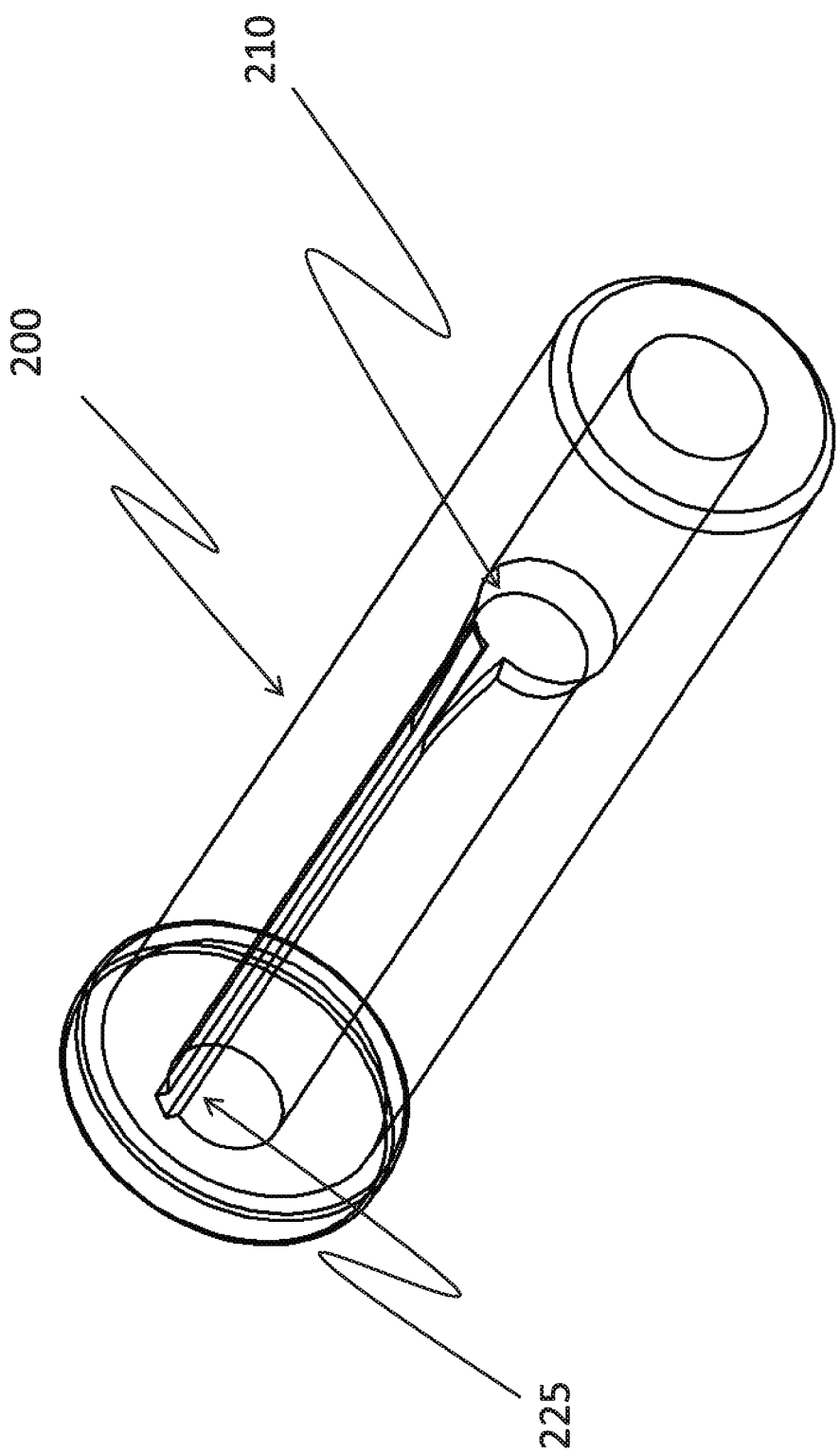
FIG. 21 is a sectional view of the molded complex shape of FIG. 20 depicting a taper molded on the interior using methods and apparatuses to mold complex shapes.

FIG. 20 depicts a molded complex shape 200 with a round interior 220 and notched feature 225. In some embodiments, notched feature 225 is partially molded into complex shape 200, with a tapered feature 210 shown in FIG. 21 used as a lead-in for round bar stock with a rib.

Figure 22:
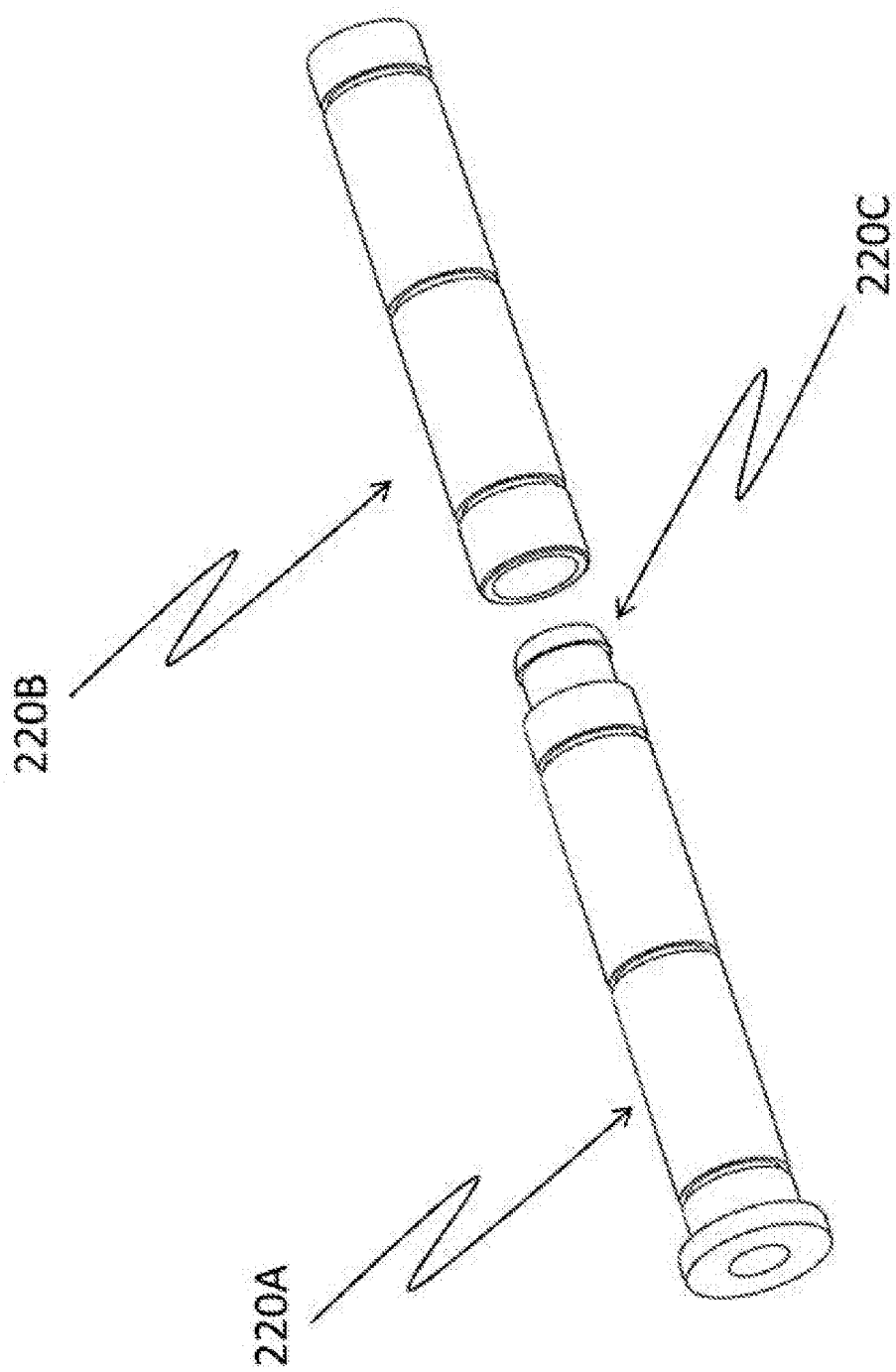
FIG. 22 is an isometric view of a molded complex shape with an example technique to extend and attach with a snap feature to another complex molded shape.

FIG. 22 shows an embodiment of a molded complex shape molded into two sections: a first interior snap section 220A and a second exterior snap section 220B. Snap feature 220C is molded into first interior snap section 220A and then used as a mold itself to over mold second exterior snap section 220B. It is appreciated that to over mold, in one embodiment, is to insert a core component into the cavity of the casting mold 20 to create a space associated with a multi-dimensional shape and inject liquid urethane into this space to cure. That is to say that liquid urethane is introduced into this space to fill the space, or in other words, over mold onto the core component. In one embodiment, the core component is a mandrel/rod coupled to a previously molded part. In another embodiment, the core component comprises a rod coupled to a cylindrical object. In the descriptions provided for FIG. 22, the core component is a mandrel coupled to the snap feature 220C. The space associated with the multidimensional shape comprises space between the cylindrical object and portions of the interior surface of the casting mold 20.

FIG. 23 shows an embodiment of a molded complex shape in a cutaway view depicted in FIG. 22, with interior snap section 220A and second exterior snap section 220B coupled together. Interior snap section 220A has desired compliance on male snap feature 220D such that interior snap section 220A collapses inside of exterior snap section 220B with minimal expansion of exterior snap section 220B. Once interior snap section 220A and exterior snap section 220B come to rest and are fully mated, the juncture of snap feature 220C and 220D are shown in cross section at rest.

The techniques and apparatuses described above facilitate a method comprising heating of the casting mold 20, sealing flange, and mold rings to between 120 F and 150 F for at least 1 hour; using production bar stock as mandrel material; oversizing said mandrel by an amount ranging between 0.020 inches to 0.050 inches to account for material shrinkage of the casting material; and using a previously molded part to over mold a second mating part. More specifically, the method comprises heating a mold (e.g., casting mold 20), a flange (e.g., end flange 52), and a mold ring (e.g., mold ring 10) to a temperature within a first temperature ranging between 120 F and 150 F. This heating can be done using conduction, convection, radiation, or a combination thereof. In one embodiment, this heating is done at a relative humidity less than or equal to 15%. The mold ring may be inserted into the cavity of the mold and heated within the cavity of the mold or, in other embodiments, heated outside the cavity of the mold before being inserted into the cavity of the mold. Similarly, the flange can be placed at a boundary between a cap coupled to the mold and at least a portion of an opening of the cavity of the mold prior to being heated or, in other embodiments, heated before being placed at the boundary between the cap coupled to the mold and at least the portion of the opening of the cavity of the mold. The mandrel (e.g., interior mandrel 28) is also inserted into the cavity of the mold, a volume of the mandrel being increased to compensate for a shrinkage associated with a casting material used to mold an object within the mold. In one embodiment, increasing the volume of the mandrel to compensate for the shrinkage associated with the casting material used to mold the object within the mold comprises using a removable sleeve to oversize the mandrel and/or machining a raw bar stock into a mandrel compatible with the object prior to molding the object. In one embodiment, the mandrel is coupled with a first mating part within the mold, the first mating part being a previously molded part. Coupling the mandrel and first mating part can create a space associated with a multi-dimensional shape for molding the object. In some embodiments, the multi-dimensional shape is partially based on the shape of the cap. The object in this case, is a second mating part to the first mating part. The casing material can then be injected via a fill port of the mold to fill the space associated with the multi-dimensional shape to form the object. As previously discussed, the casting material, in one embodiment, is liquid urethane. This liquid urethane can be injected/pumped into the space associated with the multi-dimensional shape at a pressure ranging between 8 pounds per square inch (psi) to 12 psi. In some cases, injecting the liquid urethane under a pressure ranging between 8 psi to 12 psi ensures that the mold cavity is completely filled when the wall thickness of the molded object is less than or equal to 0.1875 inches. In one embodiment, the pressure under which liquid urethane is injected into the mold is 10.5 psi. In other embodiments, the pressure under which liquid urethane is injected into the mold is 11 psi.

The heating of the mold, sealing flange, and mold rings is critical and provides a quiescent temperature which closely approximates the temperature of the casting material (e.g., liquid urethane) during the exothermic phase of the casting material once a catalyst is added to a base resin associated with the casting material. In one embodiment, the resin to catalyst ratio associated with the casting material during the exothermic phase is 10:1, with the casting material viscosity being approximately 5000 cP at a temperature of approximately 150 F-160 F. These conditions allow the casting material to easily flow into the heated mold housing at least the heated sealing flange, the heated mold rings, the heated flange, and the mandrel. Because the temperatures of the mold parts and casting material are close in value, the multi-dimensional shape within the mold cavity can be completely filled out to minimize voids. These voids can be formed if there are "cold spots" on any section of the mold parts (e.g., the mold ring, mandrel, etc.), hence the reason for the heating previously discussed.

Other features or methods associated with the process discussed above include using compressed air to blow over the mandrel in order to decrease the frictional coefficient between the mandrel and the object being molded. This eases demolding (e.g., removing the molded object from the mold after molding) the molded object. In some embodiments, the compressed air is supplied under a pressure ranging between 80 psi and 120 psi.

Additionally, a water bath may be used to cool the casting mold 20 during molding of an object. For instance, the water bath may be used to cool the casting mold 20 once the volume of the object being molded exceeds a certain threshold. In some cases, the threshold is greater than or equal to 1000 cubic inches. Moreover, the water bath may be maintained at a temperature ranging between 60 F and 80 F during cooling the casting mold 20.

It is appreciated that after the casting material (e.g., liquid urethane) is injected into the space associated with the multi-dimensional shape, the casting material is allowed to solidify or for a predefined time based on a volume of the object being molded. In some cases, the process of allowing the casting material to solidify is referred to as curing. In one embodiment, the casting material is allowed to cure within the casting mold 20 for a first time ranging between 70 seconds and 110 seconds when the volume of the object being molded is 200 cubic inches or less. In another embodiment, the casting material is cured within the casting mold 20 for a second time ranging between 120 seconds and 200 seconds when the volume of the object being molded ranges between 250 cubic inches and 900 cubic inches. In other embodiments, the casting material is allowed to cure within the casting mold 20 for a third time ranging between 220 seconds and 300 seconds when the volume of the object being molded is 1000 cubic inches or more.

To provide further context to the importance of the above method, a lathe is a machine tool used to machine bar stock for parts such as screws, shafts, hydraulic cylinders, precision rods etc. The lathe grabs (with a chuck) and rotates the raw bar stock while a cutting tool is held against the rotating bar stock. A machinist (or computer) then moves the cutting tool in and out and up and down the bar stock longitudinally to create a precision complex part. Because there are pre-established sizes to the inside diameter of the lathe spindle (i.e., the hollow area where the bar stock passes through and is grabbed by the chuck), when bar stock that has an outside diameter smaller than the spindle inside diameter and the bar stock is spinning at high speeds, it rattles and makes loud noises. Thus, a molded part, also called a complex shape, molded object, or simply object (e.g., spindle liner or hush tube) is desirable to take up the space between the bar stock and the inside diameter of the spindle liner to mitigate against this rattling, and to also ensure the safety of machinists as they machine or work on the bar stock within the lathe. This molded part is molded using the casting mold 20 discussed above.

Production bar stock can be procured from a customer and used to create the mandrel 28 (i.e., core) of the casting mold 20. This bar stock turned mandrel (core) ensures the molded part has a critical inside diameter geometry that allows minimal clearance between the actual bar stock being machined (turned in the lathe) and the molded part, which in this case is being used as a spindle liner. With the minimized clearances, the bar stock bar, when rotating at high speeds for machining, will not "chatter" or make noises within the lathe. Further, venting allows trapped air (e.g., during molding) to rise to the top of the mold cavity and prevents further creation of voids due to trapped air. It has been shown that parts with smaller volume parts (50 cubic inches) can require at least 1 vent while larger volume parts (>100 cubic inches) can require 4 vents. The addition of vents facilitates easier mold cavity filling with mold cavity position becoming less critical.

In some instances, lathes used in machining centers are positioned against bar stock feeders and therefore a reduction in space behind the rotating spindle is minimized. For these cases, and if a molded spindle liner is desired, the molded spindle liner can be molded in sections such that one shorter section can be inserted into the spindle of the lathe, and additional molded sections can be attached to allow the complete coverage of the spindle of the lathe.

In the case of a multi-faced (non-round) surfaces of bar stock to be machined (e.g., a hexagonal shape), the bar stock can be used as the mandrel 28 of the mold. In the case of hexagonal mandrel 28, the mold ring would have a hexagonal inside feature such that the mold ring could slide up and down within the interior cavity of the casting mold 20.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one embodiment," or "in some embodiments" in various places in the specification are not necessarily all referring to the same implementation or embodiment.

Finally, the above descriptions of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the disclosure of the present disclosure is intended to be illustrative, but not limiting, of the scope of the present disclosure, which is set forth in the following claims.

What is claimed:

1. An apparatus comprising:
   a mold comprising a first exterior surface, a first interior surface, a cavity, and an opening to the cavity;
   a mold ring comprising a second exterior surface, a second interior surface, and a bore, the bore being substantially parallel to the cavity comprised in the mold when the mold ring is inserted into the cavity of the mold;
   a seal covering at least a portion of the second exterior surface of the mold ring, the seal sealing a first space between the first interior surface of the mold and the second exterior surface of the mold ring during a molding of a casting material;
   a cap comprising an air vent and a third interior surface covering at least a portion of the opening to the cavity, the third interior surface being substantially perpendicular to the opening to the cavity of the mold, the cap comprising or receiving a material that is heated and pressed onto a mold object having a first shape associated with the portion of the opening to the cavity;

a mandrel comprising a third exterior surface, the mandrel being insertable into the cavity of the mold to create a second space associated with a multi-dimensional shape within the cavity, the multi-dimensional shape being based on at least a first shape of the third exterior surface of the mandrel, the casting material being moldable into a first object based on the multi-dimensional shape, the first object being useable as a spindle liner for a bar stock associated with the mandrel;

a clearance cover wrappable around the mandrel to maintain a clearance space between the mandrel and the first interior surface associated with the mold, the clearance space compensating for casting material shrinkage after the molding; and a flange placed at a boundary between the cap and at least the portion of the opening to the cavity of the mold, wherein the multi-dimensional shape associated with the second space is partially based on a second shape of the second interior surface comprised in the mold ring, the mold ring being movable within the cavity of the mold along an axis parallel to the cavity comprised in the mold to adjust a length of the first object.

2. The apparatus of claim 1, wherein the flange is fabricated from a metalized material with a first coefficient of thermal expansion (tee) substantially equivalent to a second tee associated with the mold.

3. The apparatus of claim 1, wherein the air vent comprised in the cap extends into the flange.

4. The apparatus of claim 1, wherein the air vent ranges between 0.010 inches and 0.060 inches in diameter.

5. The apparatus of claim 1, wherein the multi-dimensional shape associated with the second space is partially based on a third shape of the first interior surface of the mold.

6. The apparatus of claim 1, wherein the multi-dimensional shape associated with the second space is partially based on a fourth shape of the third interior surface of the cap.

7. The apparatus of claim 1, wherein the bore of the mold ring surrounds at least a portion of the mandrel.

8. The apparatus of claim 1, wherein the second interior surface comprised in the mold ring partially surrounds at least one or more of:
the mandrel; and
the clearance cover wrapped around the mandrel.

9. The apparatus of claim 1, wherein the mold ring is fabricated from a metalized material that has a third coefficient of thermal expansion (tee) substantially equivalent to a fourth tee associated with the mold.

10. The apparatus of claim 1, wherein the seal covering at least the portion of the second exterior surface of the mold ring to create a first diameter associated with a combination of the mold ring and the seal, the first diameter ranging between 0.020 inches and 0.05 inches, the first diameter being smaller than a second diameter associated with the cavity comprised in the mold, and wherein the clearance space ranges between 0.020 inches and 0.040 inches.

11. The apparatus of claim 1, wherein the casting material is a catalyst-activated urethane having an exothermic temperature ranging between 250 F and 350 F.

12. An apparatus comprising:
a mold comprising a first exterior surface, a first interior surface, a cavity, and an opening to the cavity;
a mold ring comprising a second exterior surface, a second interior surface, and a bore, the bore being substantially parallel to the cavity comprised in the mold when the mold ring is inserted into the cavity of the mold;
a seal covering at least a portion of the second exterior surface of the mold ring, the seal sealing a first space between the first interior surface of the mold and the second exterior surface of the mold ring during a molding of a casting material;
a cap comprising an air vent and a third interior surface covering at least a portion of the opening to the cavity, the third interior surface being substantially perpendicular to the opening to the cavity of the mold, the cap comprising a material that is heated and pressed onto a mold object having a first shape associated with the portion of the opening to the cavity;
a mandrel comprising a third exterior surface, the mandrel being insertable into the cavity of the mold to create a second space associated with a multi-dimensional shape within the cavity, the multi-dimensional shape being based on at least a first shape of the third exterior surface of the mandrel, the casting material being moldable into a first object based on the multi-dimensional shape; and
a clearance space between the mandrel and the first interior surface associated with the mold,
wherein the multi-dimensional shape associated with the second space is partially based on a second shape of the second interior surface comprised in the mold ring, the mold ring being movable within the cavity of the mold along an axis parallel to the cavity comprised in the mold to adjust a length of the first object.

13. The apparatus of claim 12, wherein the casting material is injected under pressure into the second space associated with the multi-dimensional shape within the cavity.

14. The apparatus of claim 12, wherein the mandrel is supported by the mold ring and the cap.

15. The apparatus of claim 14, wherein the mandrel is substantially located about a first central axis of the mold ring.

16. The apparatus of claim 15, wherein the mandrel is substantially located about a second central axis of the cap.

* * * * *